United States Patent
Iida et al.

(10) Patent No.: US 11,163,505 B2
(45) Date of Patent: Nov. 2, 2021

(54) IMAGE FORMING SYSTEM, IMAGE FORMING APPARATUS, INFORMATION PROCESSING APPARATUS, AND METHOD FOR CONTROLLING IMAGE FORMING APPARATUS

(71) Applicant: CANON KABUSHIKI KAISHA, Tokyo (JP)

(72) Inventors: Toshihiko Iida, Toride (JP); Yoshiji Kanamoto, Tokyo (JP); Hiroya Igarashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/427,031

(22) Filed: May 30, 2019

(65) Prior Publication Data
US 2019/0369930 A1 Dec. 5, 2019

(30) Foreign Application Priority Data

Jun. 5, 2018 (JP) .............................. JP2018-108110

(51) Int. Cl.
*G06F 3/12* (2006.01)
*H04N 1/00* (2006.01)

(52) U.S. Cl.
CPC .......... *G06F 3/1212* (2013.01); *G06F 3/1201* (2013.01); *G06F 3/127* (2013.01); *G06F 3/1257* (2013.01); *G06F 3/1288* (2013.01); *G06F 3/1293* (2013.01); *H04N 1/00946* (2013.01)

(58) Field of Classification Search
CPC ...... G06F 3/127; G06F 3/1268; G06F 3/1271; G06F 3/1275; G06F 3/1257; G06F 3/1212; G06F 3/1288; H04N 1/00944; H04N 1/00946; H04N 1/00938
USPC .......................... 358/1.11–1.18, 1.1, 1.9, 2.1
See application file for complete search history.

(56) References Cited

U.S. PATENT DOCUMENTS

| | | | |
|---|---|---|---|
| 10,976,969 B2* | 4/2021 | Iida | G06F 3/1205 |
| 2005/0046875 A1* | 3/2005 | Gibson | B41J 29/393 358/1.1 |
| 2008/0239387 A1* | 10/2008 | Otsuka | G06F 3/1206 358/1.15 |
| 2010/0179965 A1* | 7/2010 | Koshigaya | G06F 21/608 707/783 |
| 2011/0128572 A1* | 6/2011 | Hosotsubo | G06F 3/1257 358/1.15 |
| 2011/0128584 A1* | 6/2011 | Kuroshima | G06F 3/127 358/1.15 |
| 2011/0164281 A1* | 7/2011 | Takahashi | G06F 3/0486 358/1.15 |
| 2016/0266851 A1* | 9/2016 | Kanamoto | G06F 3/1228 |

FOREIGN PATENT DOCUMENTS

JP 2014219920 A 11/2014

* cited by examiner

*Primary Examiner* — Chad Dickerson
(74) *Attorney, Agent, or Firm* — Canon U.S.A., Inc. IP Division

(57) ABSTRACT

A printing system in which a client device utilizing a web browser and a printer, that provides a share folder, are communicably connected, displays a screen on which a print file can be specified by a drop operation on the web browser, transmits the specified print file and share-folder specification information from the client device to the printer, and prints the print file using print settings linked to the share folder.

12 Claims, 30 Drawing Sheets

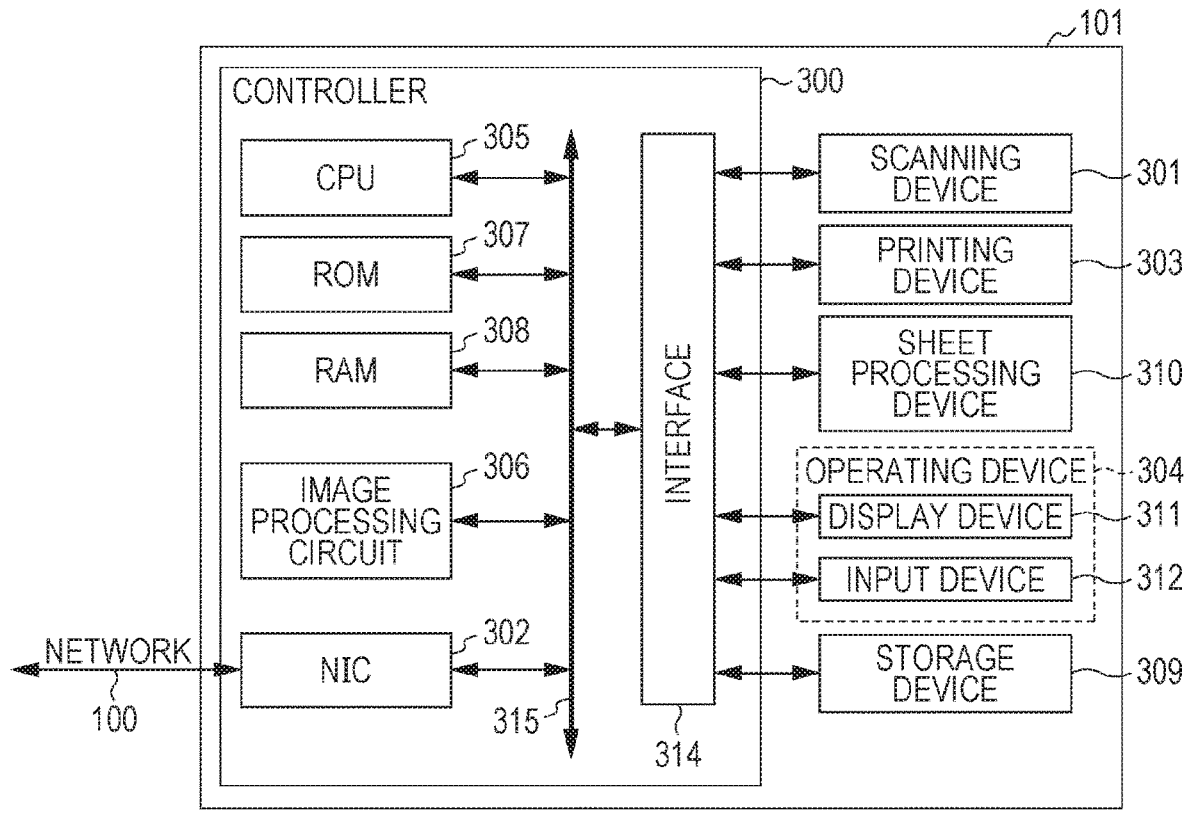

| BOOT LOADER | 451 |
| OPERATING SYSTEM | 452 |
| NETWORK CONTROL PROGRAM | 453 |
| REMOTE FILE SYSTEM (CLIENT) | 454 |
| WEB BROWSER | 455 |
| LOCAL FILE SYSTEM | 456 |
| OTHER PROGRAMS | 457 |

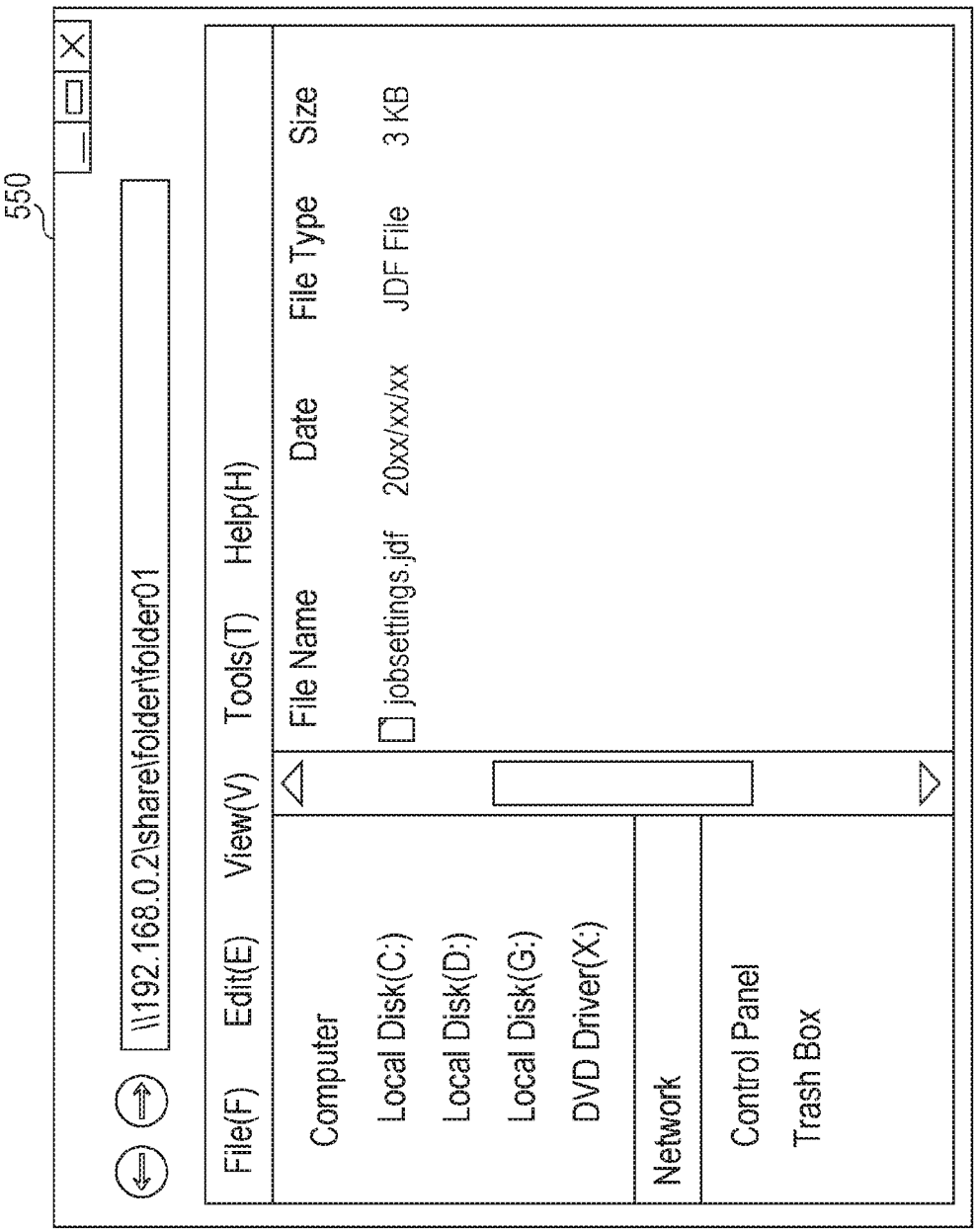

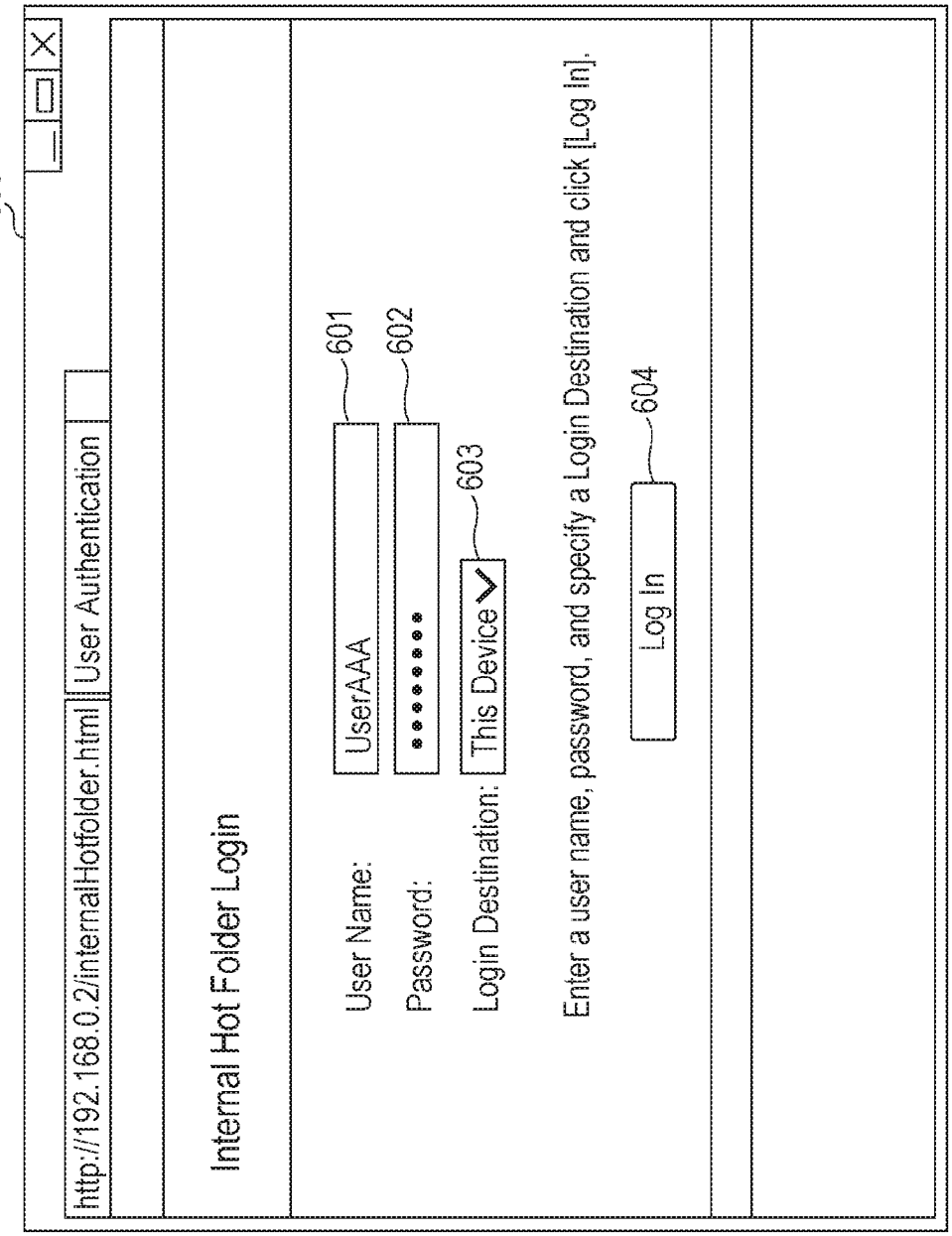

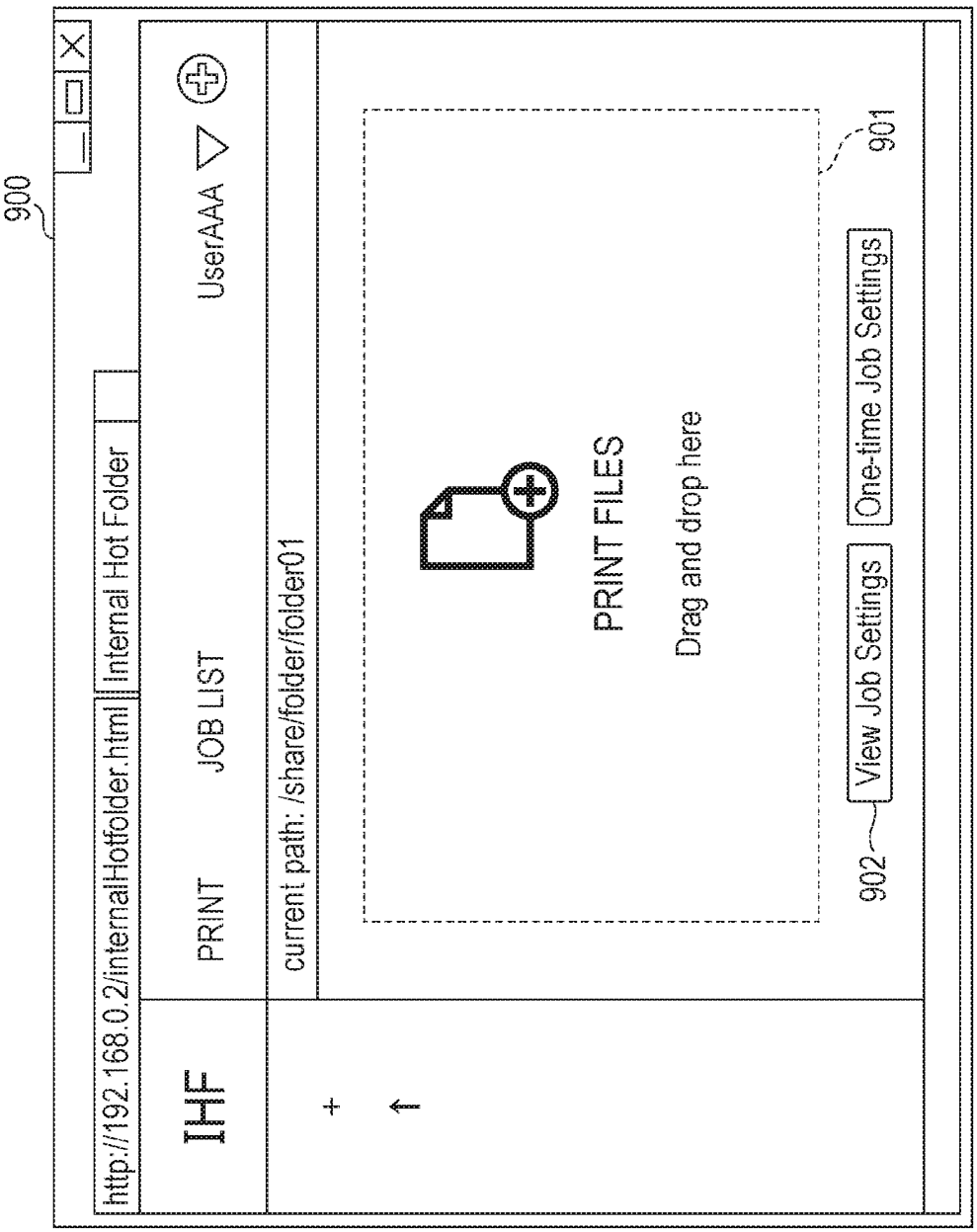

FIG. 12B

```xml
<?xml version="1.0" encoding="UTF-8" standalone="no"?>
<JDF xmlns="http://www.CIP4.org/JDFSchema_1_1"
              xmlns:cj="http://www.canon.com/ns/CanonJDF" Activation="Active"
              Category="DigitalPrinting" ICSVersions="IDP_L1-1.0 Base_L1-1.0"
              ID="ID01" JobID="JobID01" JobPartID="JobPartID01" MaxVersion="1.2"
              Status="Ready" Type="Combined"
              Types="LayoutPreparation Imposition Interpreting Rendering DigitalPrinting"
              Version="1.2" cj:OwnerName="1">
   <ResourcePool>
      <RunList Class="Parameter" ID="IDRL" PartIDKeys="Run" Status="Available">
         <RunList Run="0">
            <LayoutElement>
               <FileSpec MimeType="application/pdf" URL="cid:Content00@hostname.com"/>
            </LayoutElement>
         </RunList>
      </RunList>
      <LayoutPreparationParams Class="Parameter" ID="IDLPP" Sides="OneSidedFront" Status="Available"/>
      <ColorantControl Class="Parameter" ID="IDCC" Status="Available"/>
      <InterpretingParams Class="Parameter" ID="IDIP" Status="Available"/>
      <RenderingParams Class="Parameter" ID="IDRP" Status="Available"/>
      <DigitalPrintingParams Class="Parameter" Collate="SheetSetAndJob" ID="IDDPP" Status="Available">
         <MediaRef rRef="MED_000"/>
         <Disjointing OffsetDirection="None"/>
      </DigitalPrintingParams>
      <Component Class="Quantity" ComponentType="FinalProduct" ID="IDC_DPP" Status="Unavailable"/>
      <Media Class="Consumable" Dimension="842 595" ID="MED_000" Status="Available">
         <Location LocationName="AutoSelect"/>
      </Media>  </ResourcePool>
   <ResourceLinkPool>
      <LayoutPreparationParamsLink CombinedProcessIndex="0" Usage="Input" rRef="IDLPP"/>
      <RunListLink CombinedProcessIndex="0 1" Usage="Input" rRef="IDRL"/>
      <ColorantControlLink CombinedProcessIndex="2 4" Usage="Input" rRef="IDCC"/>
      <InterpretingParamsLink CombinedProcessIndex="2" Usage="Input" rRef="IDIP"/>
      <RenderingParamsLink CombinedProcessIndex="3" Usage="Input" rRef="IDRP"/>
      <DigitalPrintingParamsLink CombinedProcessIndex="4" Usage="Input" rRef="IDDPP"/>
      <ComponentLink Amount="1" CombinedProcessIndex="4" Usage="Output" rRef="IDC_DPP"/>
      <MediaLink CombinedProcessIndex="4" Usage="Input" rRef="MED_000"/>
   </ResourceLinkPool>
</JDF>
```

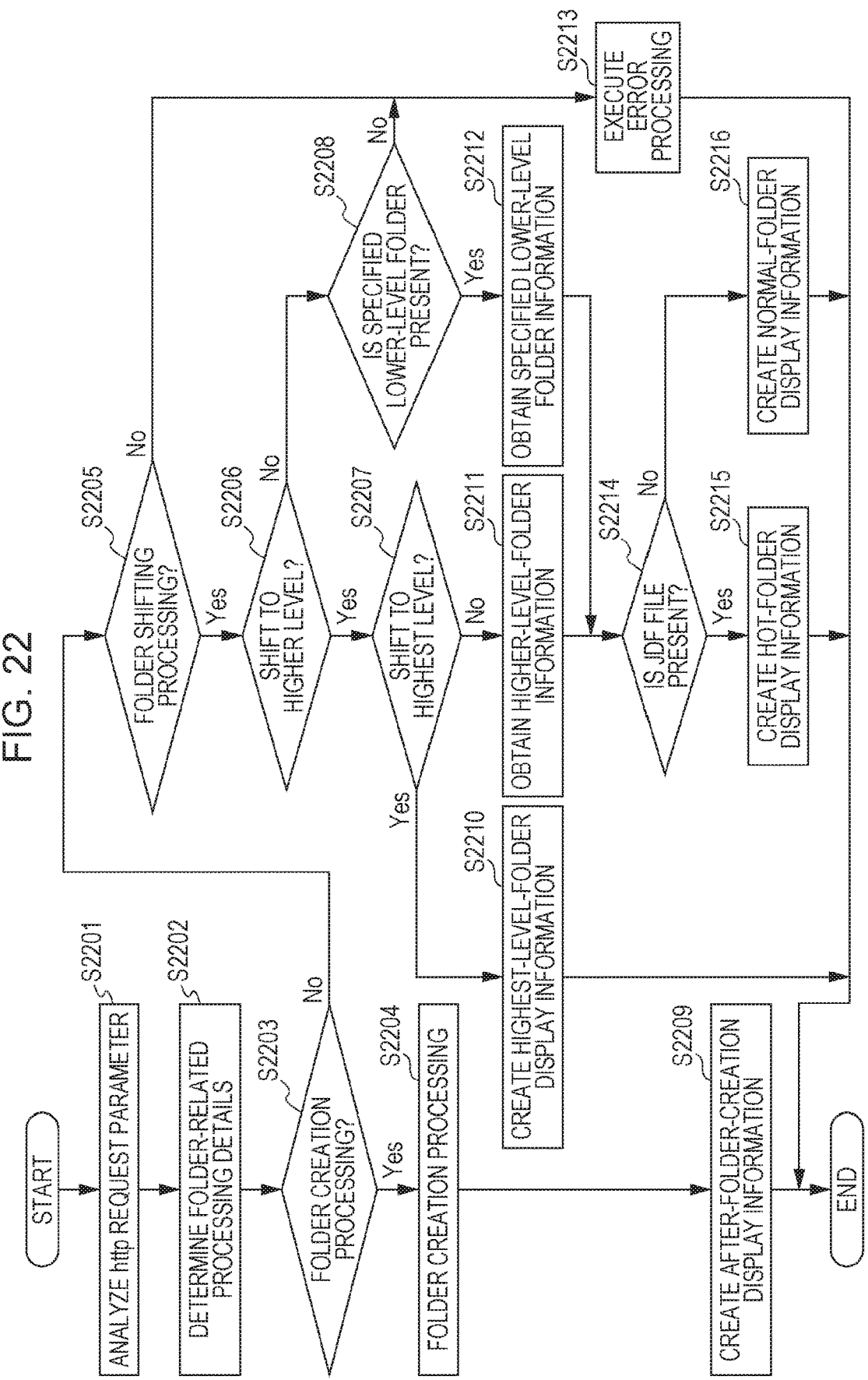

IMAGE FORMING SYSTEM, IMAGE FORMING APPARATUS, INFORMATION PROCESSING APPARATUS, AND METHOD FOR CONTROLLING IMAGE FORMING APPARATUS

BACKGROUND

Field of the Disclosure

The present disclosure generally relates to image forming apparatuses for forming (printing) images on sheets (paper), and in particular, to an image forming apparatus including a folder accessible from an external device.

Description of the Related Art

A known method for specifying a target file (print file) to be printed by an image forming apparatus, such as a printer, uses a hot folder function. This hot folder function is implemented by a monitoring application for monitoring a folder in a client device. When a print file is stored in the monitored folder, the monitoring application transmits print settings etc., linked to the folder to a printer. The printer starts printing based on the transmitted data (Japanese Patent Laid-Open No. 2014-219920). The hot folder function allows specification of a print file using drag-and-drop, allowing intuitive operation.

Since the image forming system disclosed in Japanese Patent Laid-Open No. 2014-219920 has the monitoring application in the client device, the monitoring application may have an unexpected configuration and usage environment of the client device. However, image forming systems may achieve the intuitive operation of the hot folder function by using a mechanism that is hardly influenced by the configuration and usage environment of the client device.

SUMMARY

The present disclosure generally provides a print file specification environment for various devices in an image forming system that prints a print file using print settings linked to a folder. In particular, the present disclosure provides an intuitive operational environment using, for example, a drag-and-drop operation.

The present disclosure provides an image forming system in which an information processing apparatus utilizing a web browser and an image forming apparatus that provides a folder accessible from the information processing apparatus are communicably connected. The system includes an operation unit configured to transmit screen information from the information processing apparatus to the image forming apparatus, an application unit, in the web browser of the information processing apparatus, configured to output a specification screen on which a print file can be specified by a drop operation based on the transmitted screen information, a transfer unit configured to transmit the print file specified by the web browser and folder specification information from the information processing apparatus to the image forming apparatus, and a printing unit, in the image forming apparatus, configured to print the specified print file using print settings linked to the folder specified by the specification information.

Further features of the present disclosure will become apparent from the following description of exemplary embodiments with reference to the attached drawings.

BRIEF DESCRIPTION OF THE DRAWINGS

FIG. 3A is a diagram illustrating the hardware configuration of the printer.

FIG. 3B is a diagram illustrating the software configuration of the printer.

FIG. 5B is a diagram illustrating the file system of the internal hot folder.

FIG. 6A is a diagram illustrating the login screen of a WEB page.

FIG. 9A is a diagram illustrating the hot folder screen of the WEB page.

FIG. 12B is a diagram illustrating the configuration of a JDF file.

FIG. 22 is a detailed flowchart illustrating folder operation processing.

DESCRIPTION OF THE EMBODIMENTS

Embodiments of the present disclosure will be specifically described hereinbelow with reference to the drawings. The scope of the present disclosure is not limited to the configurations of the embodiments. Part or the whole of the configurations may be replaced with their equivalents if the same advantageous effects as the desired effects are given.

Embodiments

In the present embodiment, a printing system 1 using an internal hot folder will be described by way of example. The entire system is described, and then the individual configurations will be described in detail.

System Usage Environment

Figure 1A:
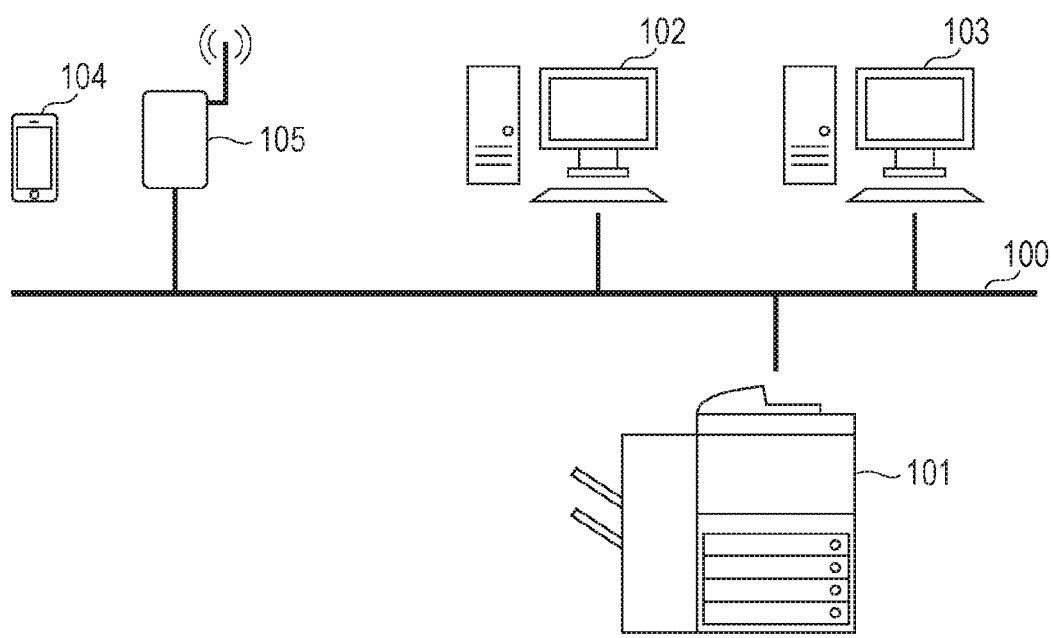
FIG. 1A is a diagram illustrating the usage environment of a printing system.
Figure 1B:
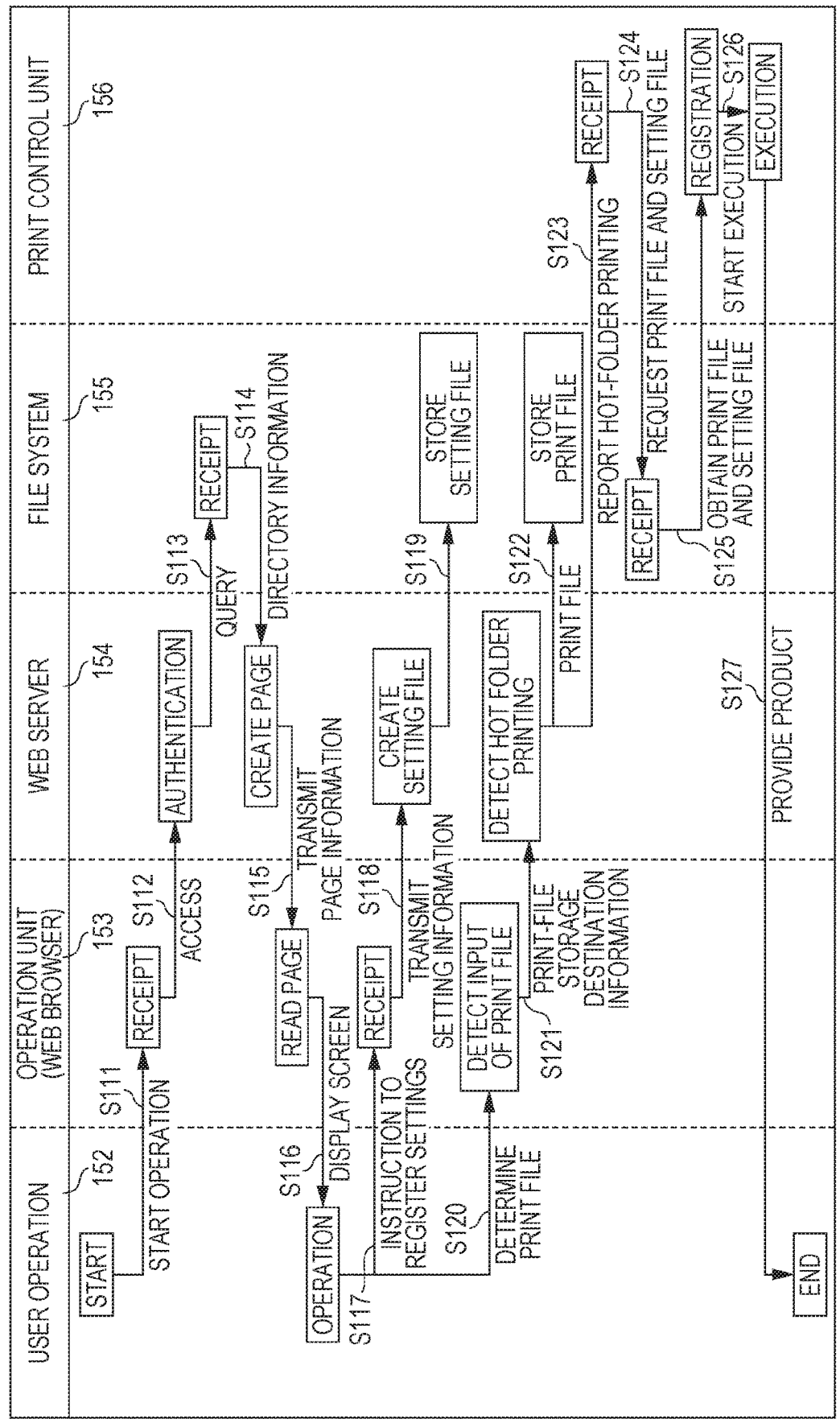
FIG. 1B is a system flowchart of an internal printing system.

First, a system usage environment of the present embodiment will be described. The usage environment of the printing system 1 (image forming system) is illustrated in FIGS. 1A and 1B. FIG. 1A is a diagram illustrating the usage environment of the printing system 1.

As illustrated in FIG. 1A, the usage environment of the printing system 1 includes a printer 101, personal computers (PCs) 102 and 103, and a mobile terminal 104. The printer 101 and the PCs 102 and 103 are communicably connected through a network 100. The printer 101 and the mobile terminal 104 are communicably connected via the network 100 and a wireless local area network (LAN) access point 105.

The printer 101 is an image forming apparatus (a printing apparatus) that forms (prints) images on a sheet (paper). The printer 101 may be a multifunction printer (MFP) or a single function printer (SFP). In the case of MFP, the printer 101 has a plurality of functions such as a print function for printing based on print data received from an external device and a copying function for printing images read from an original.

The PCs 102 and 103 and the mobile terminal 104 are client devices (information processing apparatuses) capable of transmitting data to the printer 101. The PCs 102 and 103 and the mobile terminal 104 vary in the type and the version of the operating system. Accordingly, if an environment of transmitting print data to the printer 101 is to be implemented using an application program, an application program needs to be prepared in accordance with the system environment of each device. In the present embodiment, a print data transmission environment is implemented using a WEB page provided by the printer 101. This allows each client device to transmit print data to the printer 101 as long as the client device has a web browser. Hereinafter, when there is no need to make a particular distinction, the PC 102, the PC 103, and the mobile terminal 104 are collectively referred to as "client device (102, 103, or 104)".

System Processing Procedure

Next, a processing procedure for use of the printing system 1 will be described. In the description, the printing system 1 is divided into a plurality of subsystems, and information exchanged among the subsystems will be illustrated using a flowchart. FIG. 1B is a system flowchart of the internal hot folder system. In FIG. 1B, a user 106 is the operator of the client devices (102, 103, or 104) and the user of the internal hot folder function. The subsystem for the user 106 is a user operation 152. The user operation 152 describes the role of the user 106 at the use of the internal hot folder function.

An operation unit 153 is a subsystem provided by the client device (102, 103, or 104) that executes a web browser. The operation unit 153 performs processing for screen transition of the web browser, transmission and reception of data to and from the printer 101, and execution of a Java®Script.

The printer 101 is divided into three subsystems, that is, a web server 154, a file system 155, and a print control unit 156. The web server 154 is a subsystem that provides web page information on the internal hot folder. The file system 155 is a subsystem that executes processing for presenting a shared folder and a file provided by the printer 101 to the external device. The print control unit 156 is a subsystem that registers and executes a print job based on a file obtained using the internal hot folder function.

The printing system 1 is used as follows. First, the user instructs the web browser of the operation unit 153 to start the operation (step 111, hereinafter referred to as S111). Specifically, the user inputs a specific web address and presses a start button to give an instruction to shift to a specified screen.

The operation unit 153 that has accepted the instruction accesses the web server 154 of the printer 101 (S112). The web server 154 that has accepted the access request executes processing for authenticating the user 106 who has accessed. Here, assuming the authentication processing has succeeded, its detailed description will be omitted.

If the authentication has succeeded, the web server 154 queries the file system 155 to obtain directory information on a specific folder (S113).

The file system 155 returns the directory information as a response to the inquiry (S114).

The web server 154 generates page information based on the directory information and outputs the page information to the operation unit 153 (S115).

The operation unit 153 which has obtained the page information generates a page screen based on the page information and presents the page screen to the user 106 (S116).

The user 106 who has confirmed the page screen gives an instruction to create a hot folder and performs processing for setting a print function linked to the hot folder (S117). Description of screen update processing and exchange of information between the subsystems involved with the setting processing will be omitted.

Upon receiving the instruction, the operation unit 153 outputs print setting information designated to register to the web server 154 (S118).

The web server 154 obtains a set file based on the print setting information and stores the set file in a designated directory in the file system 155 (S119). Thus, the folder in which the set file is stored functions as a hot folder.

The user 106 inputs a print file to the hot folder (S120). The file input operation is implemented by dragging and dropping the file to the web browser. The operation unit 153 which has detected the print file input operation transmits the print file and folder path information (storage destination information and folder specification information) to the web server 154 (S121).

The web server 154 which has detected hot folder printing outputs the print file to the folder that the folder path information indicates (S122). Thus, the print file is stored in the specified folder in the file system 155.

Accordingly, the web server 154 outputs a notification of the use of hot folder printing to the print control unit 156 (S123). The print control unit 156 which has received the notification requests the print file and a print setting file associated with the storage destination hot folder from the file system 155 (S124) and acquires the print file and the print setting file (S125). The print control unit 156 registers a print job in a print queue based on the obtained print file and the print setting file. When the order of the registered print job is reached, print processing is executed (S126). Thus, a sheet on which an image is formed is provided to the user 106 as a product (S127).

Among the above steps, a sequence of processes from step S210 to step S211 correspond to a characteristic procedure that resolves the problems of the known hot folder system, described above. In the present embodiment, the processing for inputting a print file to a hot folder is implemented using a WEB page, as described above. This reduces the influence of the individual difference among the client devices in constructing a print data transmission environment. More specifically, the related art needs to prepare a file-input detection program for each client in transmitting print target data from the client device to a printer using the hot folder function. Even if the folder to be monitored is provided in the printer, an access program, such as a file browser, has to be prepared in each client. These programs are prone to be influence by the kind of the operating system and the network environment, so that it is difficult to use for general purpose. For this reason, the user needs to prepare a program suitable for the client device to be used. In contrast, the present embodiment provides a file input environment using a drag and drop operation by using a web browser. This allows providing a highly convenient hot folder function improved from the related art. This is a description of a system procedure for using the hot folder function.

System Configuration

Figure 2:
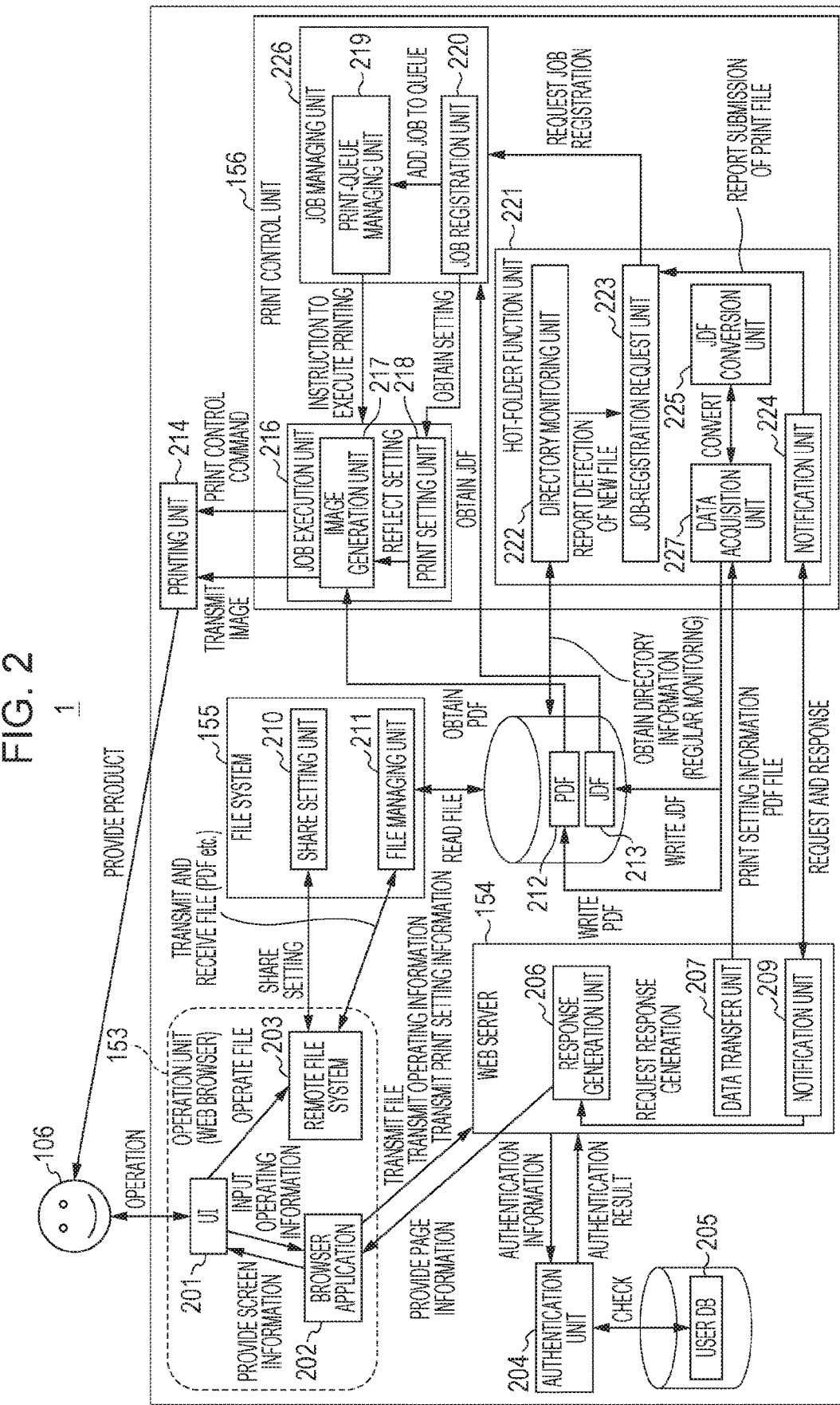
FIG. 2 is a diagram illustrating the functional configuration of the internal printing system.

Next, the system configuration of the printing system 1 will be described. FIG. 2 is a diagram illustrating the functional configuration of the hot folder printing system. As illustrated in FIG. 2, the printing system 1 can be expressed as a group of multiple functional modules. The modules may be implemented by hardware or software. Part of the functional modules may be disposed in an external server (not illustrated), and the functions may be implemented by communicating with the external server.

The printing system 1 includes the operation unit 153, the web server 154, the file system 155, and the print control unit 156, described above, and a printing unit 214 and an authentication unit 204.

The operation unit 153 includes a user interface (UI) 201, a browser application 202, and a remote file system 203.

The UI 201 is a functional unit provided to display image information and to provide units that give data input and output instructions and receive an operation instruction. The details of the user operation are reflected to the browser application 202 and the remote file system 203.

The browser application 202 is a functional unit that presents screen information by displaying web contents on a window screen on the UI 201. The browser application 202 transmits and receives information to and from the web server 154, described later. The browser application 202 mainly provides screen information to the UI 201.

The remote file system 203 is a functional unit for operating folders and files in the printer 101 using a file system function of the client device. The remote file system 203 accesses a file managing unit 211 under access authority based on the setting information of a share setting unit 210 to perform various operations. The remote file system 203 and the share setting unit 210 exchange share setting information. The use of the remote file system function allows specifically the following operations: execution of processes related to the file system, such as obtaining folder hierarchy information, path information, information on the subfolders of each folder and a file list, creating and deleting folders, and creating and deleting files.

The function of the remote file system 203 also allows inputting files to a folder under the control of the file managing unit 211. Examples include inputting a print file, such as a portable document format (PDF) file, to a hot folder and inputting a job definition format (JDF) file to a shared folder so that the file can be used as a hot folder. In the present embodiment, a method for using a hot folder using a WEB page will be described. For this reason, a detailed description of a method for using the hot folder function using a file system will be omitted.

The file system 155 is a functional unit that executes processing for presenting shared folders and files provided by the printer 101 to the external device. In other words, the file system 155 is a functional unit that manages share folders and shared folders. The file system 155 includes the share setting unit 210 and the file managing unit 211. The file managing unit 211 is a functional unit that manages folders and files provided in the storage area in the printer 101. The file managing unit 211 reads and writes files from and to the storage area. The share setting unit 210 is a functional unit that copes with access authority setting on folders and files managed by the file managing unit 211. The access authority can be set for each user.

The web server 154 is a functional unit that provides the web service of the printer 101 to the external device. The web server 154 executes a sequence of processes for receiving various requests from the external device and returning results of executing processes according to the requests to the external device in the form of page information. The web server 154 includes a response generation unit 206, a data transfer unit 207, and a notification unit 209.

The response generation unit 206 is a functional unit that executes processing when receiving a request for page update from the browser application 202 of the client device (external device). The response generation unit 206 determines page information to be transmitted based on the request and transmits the page information to the browser application 202.

The data transfer unit 207 is a functional unit that executes processing of data transmitted via the browser application 202. The data transfer unit 207 obtains a PDF file 212 from the browser application 202 and transfers the PDF file 212 to a data acquisition unit 227. The data transfer unit 207 obtains print setting information from the browser application 202 and transfers the print setting information to the data acquisition unit 227.

The notification unit 209 is a functional unit the exchanges information with a hot-folder function unit 221 upon receiving a request. For example, when a print file (PDF file 212) is transmitted via the browser application 202, that is, when a request for hot folder printing is given, the notification unit 209 sends the request for hot folder printing to the hot-folder function unit 221. The notification unit 209 also controls the executing timing of a sequence of processes including print processing and folder hierarchy shifting processing, generation of drawing information and returning processing involved therewith. Upon receiving an image update response from a notification unit 224, the notification unit 209 requests a page generation unit to generate a page.

The web server 154 can switch between permission and non-permission of the use of the web service by operatively connecting to the authentication unit 204. In other words, the web server 154 can implement user access control of the web service.

The authentication unit 204 is a functional unit that performs processing when receiving authentication information from the web server 154. When receiving authentication information (user name and password) from the browser application 202, the authentication unit 204 checks the authentication information with a user database (DB). The user DB is stored in a storage area in the printer 101. The user DB contains a plurality of user names and passwords linked to the user names. The authentication unit 204 searches the user DB for a user name that matches the obtained user name. If the user DB contains a matched user name, then the authentication unit 204 determines whether the obtained password matches the password stored in the user DB. If both of the user name and the password match, the authentication unit 204 notifies the WEB server 254 that the authentication has succeeded. If neither one matches, the authentication unit 204 notifies the WEB server 254 that the authentication has failed. Upon receiving a success of authentication, the web server 154 permits the user to use a web service provided by the web server 154. In other words, the web server 154 permits the user to use the hot folder function.

The printing unit 214 is a functional unit that controls image forming processing (print processing) for forming images on a sheet. The product output from the printing unit 214 is provided to the user 106.

The print control unit 156 is a functional unit that performs a sequence of control operations for controlling the printing unit 214 to form an image on a sheet based on print data and processing the sheet. Here, a sequence of image forming operations executed based on print data is referred to as a print job. The print control unit 156 manages the processing on a per print job basis. The print control unit 156 includes a job execution unit 216, a job managing unit 226, and a hot-folder function unit 221.

The hot-folder function unit 221 is a core functional unit for implementing the internal hot folder function in the printer 101. A group of functions provided by the hot-folder function unit 221 includes processing related to creation of a hot folder, processing related to execution of an input print job, processing for setting the internal hot folder function itself, and processing for presenting an operation screen to the operation unit 153 for providing instructions on the functions. The hot-folder function unit 221 includes a directory monitoring unit 222, a job-registration request unit 223, a data acquisition unit 227, a JDF conversion unit 225, and a notification unit 224.

The notification unit 224 is a functional unit that communicates with the notification unit 209. When receiving a print-processing execution trigger from the notification unit 209, the notification unit 224 requests the job-registration request unit 223 to register a job. When receiving a screen update trigger from the notification unit 209, the notification unit 224 returns information for use in displaying an operating screen for the operation it 153. For example, when receiving a request for folder operation from the notification unit 209, the notification unit 224 returns information based on directory information obtained from the directory monitoring unit 222 to the notification unit 209.

The data acquisition unit 227 is a functional unit that obtains data transferred from the data transfer unit 207. Upon obtaining the PDF file 212 from the data transfer unit 207, the data acquisition unit 227 performs storage processing for storing the PDF file 212 in a storage area in the printer 101. Specifically, the data acquisition unit 227 requests the file managing unit 211 to store the PDF file 212 so as to store the PDF file 212 in the storage area. The data acquisition unit 227 performs storage processing for storing a print setting file based on the print setting information from the data transfer unit 207 in the storage area in the printer 101. Specifically, the data acquisition unit 227 converts the print setting information to a JDF file 213 using a JDF conversion unit 325. The data acquisition unit 227 requests the file managing unit 211 to store the JDF file 213 so as to store the JDF file 213 in the storage area.

The JDF conversion unit 225 is a functional unit that performs setting-information conversion processing. When obtaining the print setting information from the data acquisition unit 227, the JDF conversion unit 225 replaces the print setting information with a JDF-format command and returns the JDF-format command to the data acquisition unit 227.

The job-registration request unit 223 is a functional unit that requests the job managing unit 226 to register a print job based on the PDF file 212 and the JDF file 213. The information for use in registering the print job includes storage destination information on the PDF file 212 and storage destination information on the JDF file 213.

Thus, the internal hot folder function of the present embodiment is characterized in that print data is received via the web server 154. Accordingly, the print job is executed as a result of the notification unit 224 receiving a print-processing execution trigger from the notification unit 209 managed by the web server 154, and the job-registration request unit 223 requesting the job registration unit 220 to register the print job.

The printer 101 of the present embodiment can use a known internal hot folder function. The directory monitoring unit 222 is a functional unit that obtains directory information managed by the file system 155. In response to reception of a request for directory information, the directory monitoring unit 222 obtains directory information managed by the file system 155. For example, for folder operating processing, the directory monitoring unit 222 obtains directory information such as a folder hierarchy structure, and the directory information is transmitted to the web server 154 via the notification unit 224. The directory information may be directly exchanged between the file system 155 and the web server 154.

The directory monitoring unit 222 also functions as a functional unit for determining whether a print target file is stored. The directory monitoring unit 222 regularly monitors whether print data, such as the PDF file 212, is added in a specific folder managed by the file system 155. If the directory monitoring unit 222 detects by the regular monitoring processing that a print target file is stored, the directory monitoring unit 222 requests the job-registration request unit 223 to register a print job. In the case where the internal hot folder function is used only on a WEB page, this monitoring may be stopped. Stopping the monitoring reduces access to the storage area, leading to power saving of the printer 101.

The job managing unit 226 is a functional unit that manages information on a print job. The job managing unit 226 includes a print-queue managing unit 219 and a job registering unit 220.

The job registering unit 220 is a functional unit that registers bibliography information on the print data in response to a registration request. The bibliography information to be registered includes a print data storage destination address, user information, a storage destination address of print setting information or the print setting file, and status information.

The print-queue managing unit 219 is a functional unit that sequences individual print jobs and manages the order of execution. When a job is registered by the job registering unit 220, the print-queue managing unit 219 queues the registered job in a print queue (a waiting list). The print-queue managing unit 219 gives an instruction to execute the first job of the print queue to the job execution unit 216. The completed print job is removed from the print queue. The print-queue managing unit 219 processes the next print job in the same manner until no print job is left in the print queue.

The job execution unit 216 is a functional unit that performs various kinds of control involved in executing print processing. The job execution unit 216 includes an image generation unit 217 and a print setting unit 218.

The image generation unit 217 is a functional unit that generates images on a per page basis based on the print data. The image generation unit 217 obtains the PDF file 212 and generates images based on a PDL command in the PDF file 212. The generated images are transmitted to the printing unit 214.

The print setting unit 218 is a functional unit that reflects print setting to the image generated by the image generation unit 217. The print setting unit 218 extracts print setting from the JDF file 213 via the job registering unit 220 and reflects the extracted print setting to image generation of the image generation unit. The print setting unit 218 determines a print control command to be transmitted to the printing unit 214 based on the extracted print setting.

The functional configuration of the printing system 1 is as described above. This configuration allows the PDF file 212 stored via a WEB page to be printed according to the print setting of the JDF file 213 linked to the hot folder.

Printer Hardware

The hardware of the printer 101 will be described. FIG. 3A is a diagram illustrating the hardware configuration of the printer 101.

As illustrated in FIG. 3A, the printer 101 includes a controller 300, a scanning device 301, a printing device 303, a sheet processing device 310, an operating device 304, and a storage device 309.

The scanning device 301 is a device for reading an original to generate image data. The scanning device 301 may be a platen scanner that scans an original placed on a pressure plate platen with a moving image sensor or a document feeder scanner that scans an original conveyed by a conveying roller or the like with a fixed image sensor.

The printing device 303 (image forming device) is a device that can execute print processing for forming images on a sheet. The printing device 303 functions as the printing unit 214. The printing device 303 may be an electrophotographic device or an inkjet device. The printing device 303 may be a monochrome device or a full-color device. An electrophotographic full-color device develops a latent image formed on a photosensitive drum through charging and exposing processing with toner. After yellow (Y), magenta (M), cyan (C), and black (K) toners are superposed, the image is transferred to a sheet and is thermally fixed to form an image. The sheets to be used in image formation may be conveyed from a manual feed tray or conveyed from a cassette.

The sheet processing device 310 is a device for obtaining a product resulting from various kinds of process on media (sheets, or paper) on which images are formed by the printing device 303. The sheet processing device 310 may perform stapling, punching, stapleless stapling, bookbinding, or any other processing.

The operating device 304 is a user interface (an operating panel) that prompts the user to perform an operation and receives the user operation. The operating device 304 includes a display device 311 that functions as a display for displaying information to the user. An example of the display device 311 is a liquid-crystal display. The operating device 304 includes an input device 312 that functions as an input unit for accepting user operation. Examples of the input device 312 include hard keys and a touch sensor for using the display as a touch screen.

The storage device 309 is a non-volatile memory for storing a large volume of information. Examples of the storage device 309 include a hard disk drive (HDD) and a solid-state drive (SSD). The storage device 309 stores job data, such as print data, setting information, system programs, and application programs.

The controller 300 is a control device that controls the devices of the printer 101 in an integrated manner. The controller 300 includes a central processing unit (CPU) 305, a read only memory (ROM) 307, a random access memory (RAM) 308, an image processing circuit 306, a network interface card (NIC) 302, and an interface 314. These components are connected so as to communicate with each other by a system bus 315.

The CPU 305 is a processor that executes various processes based on commands described in programs. The CPU 305 implements various functions by controlling the devices of the printer 101 by executing the various programs described later.

The ROM 307 is a read only memory. The ROM 307 stores programs for the boot sequence and font information, the above programs, and other various programs. The programs stored in the ROM 307 are read by the CPU 305.

The RAM 308 is a readable and writable memory. The RAM 308 functions as a main memory and a work area for the CPU 305. The RAM 308 stores image data to be temporarily used, a decompressed program, and various kinds of setting information.

The NIC 302 is a communication interface for communicating with an external device through the network 100. The NIC 302 may be a wired communication interface or a wireless communication interface. The NIC 302 may also be used to transmit and receive image data to and from an external device.

The image processing circuit 306 is a processing circuit for generating and converting image data. The image processing circuit 306 performs processing for converting PDL-format print data to bitmap-format data. The bitmap-format data is compressed as necessary and is then transferred to the printing device 303 for printing.

The interface 314 is a device interface for inputting and outputting information to and from each device. Although the present embodiment describes one interface for simplicity, the interface may be provided for each device. The interface 314 outputs a control command to the scanning device 301 and receives an input of image data from the scanning device 301. The interface 311 outputs a control command and image data to the printing device 303 and receives an input of status information from the printing device 303. The interface 314 outputs a control command to the sheet processing device 310 and receives an input of image data from the sheet processing device 310. The interface 314 outputs a control command and screen information to the operating device 304 (the display device 311) and receives an input of the result of user operation from the operating device 304 (the input device 312). The interface 314 outputs a control command and write target data to the storage device 309 and receives an input of read target data from the storage device 309.

Printer Software

The software of the printer 101 will be described. FIG. 3B is a diagram illustrating the software configuration of the printer 101. These programs are stored in the ROM 307 or the storage device 309 and are read by the CPU 305 for execution.

A boot loader 351 includes programs to be executed immediately after the power of the printer 101 is turned on. These programs include programs for executing various start-up sequences necessary to start the system.

An operating system 352 is a program for providing execution environments for various programs for implementing the functions of the printer 101. The operating system 352 mainly provides the functions of management of the resources of the printer 101, such as the ROM 307, the RAM 308, and the storage device 309, and basic input and output control of the components illustrated in FIG. 3A.

A network control program 353 is a program to be executed in transmitting and receiving data to and from a device connected through the network 100. This program is used in receiving a print file, transmitting data from an external device, transmitting and receiving a command, and any other processing operations. The network control program 353 includes a driver program for controlling the NIC 302.

A file system (server) 354 is a server program for providing requests to create, transmit, and receive a file in the storage device 309 of the printer 101 to an external device connected via the network 100. Enabling and activating the program allows the client device (102, 103, or 104) connected through the network 100 to use the file in the storage device 309 and a service provided by the file system 354 via the network 100.

It is also possible to input a print tile using this file system function. However, the type of the network file sharing protocol supported by the file system (server) 354 is diverse, and the version thereof is also diverse. For this reason, the default shared file access program of the client device cannot ensure accessibility to the file system (server) 354. For this reason, the client devices (102, 103, and 104) need preparation such as installing an application corresponding to such sharing protocol types.

A web server 355 is a service function providing program for providing web contents and web services using web programs of the printer 101. The web services can be used by the client devices (102, 103, and 104) connected through the network 100. Enabling and activating the program enables the client devices (102, 103, and 104) connected through the network to use web contents and web services, such as web programs, provided by the printer 101 through the network 100.

A hot folder function program 356 is a characteristic program of the printer 101 of the present disclosure. This program is for detecting reception of a request for a web service from a client device connected to the network 100 using the web server 355. The program is configured to execute a sequence of functions provided as an internal hot folder function in response to the detected received request. In other words, the hot folder function program 356 is a program that allows replacing a request transmitting operation from an external device with a printing operation.

The hot folder function program 356 employs a method of transmitting html data and programs such as a JavaScript by communicating with the client device (102, 103, or 104) via the web server 355 according to a hypertext transfer protocol (http). Hypertext markup language (html) is a markup language. As a result of a web browser 455 executing the hot folder function program 356, the hot folder function including print target file transmission and reception processing is implemented. The communication method using the http aims to browse various information and provide various functions using a method that does not depend on the device or the operating system type. Thus, the problems of the known hot folder function are resolved by the http communication method that the hot folder function program 356 employs. This makes it possible to maximize the benefits of the hot folder.

A JDF function program 357 is a program for executing the JDF print function when JDF job data is received. The IDE function program 357 provides JDF job data analyzing processing, setting determination processing, setting changing processing, and other functions. The JDF function program 357 is for controlling the printing device 303, the sheet processing device 310, the storage device 309, the image processing circuit 306, and so on.

A PDL print function program 358 is a program for executing a PDL print function when PDL data (print job data) is received. The PDL print function program 358 is for controlling the printing device 303, the sheet processing device 310, the storage device 309, the image processing circuit 306, and so on.

A media management program 359 is a program for executing a management function related to sheets available for the printer 101. Sheet-related information managed by the program is stored in the storage device 309.

A user authentication program 360 is a program for providing the functions of the printer 101 according to the usage authentication of the user. The user authentication program 360 is used in user authentication processing, user usage authentication setting processing, processing for determining whether the function is available, and function limiting processing. Processing for inputting authentication information involved in the authentication processing can be performed not only from the operating device 304 of the printer 101 but also from the web browsers 455 of the client devices (102, 103, and 104).

A print-job-queue management program 361 is a program for managing the life cycle of processing for executing the generated print job. In other words, the print-job-queue management program 361 is a program for generating job management information including generation of a job, printing processing, post-printing processing, and confirmation of job status during the processing. The print job is generated using, for example, the JDF function program 357, the PDL print function program 358, or the hot folder function program 356.

Other programs 362 refer to programs other than the above programs of the programs stored in the ROM 307 that the printer 101 can execute. An example is a display control program for causing the display of the operating device 304 to display various UI screens. Since these programs are not features of the present embodiment, descriptions thereof will be omitted.

Client Hardware

Figures 4A, 4B:
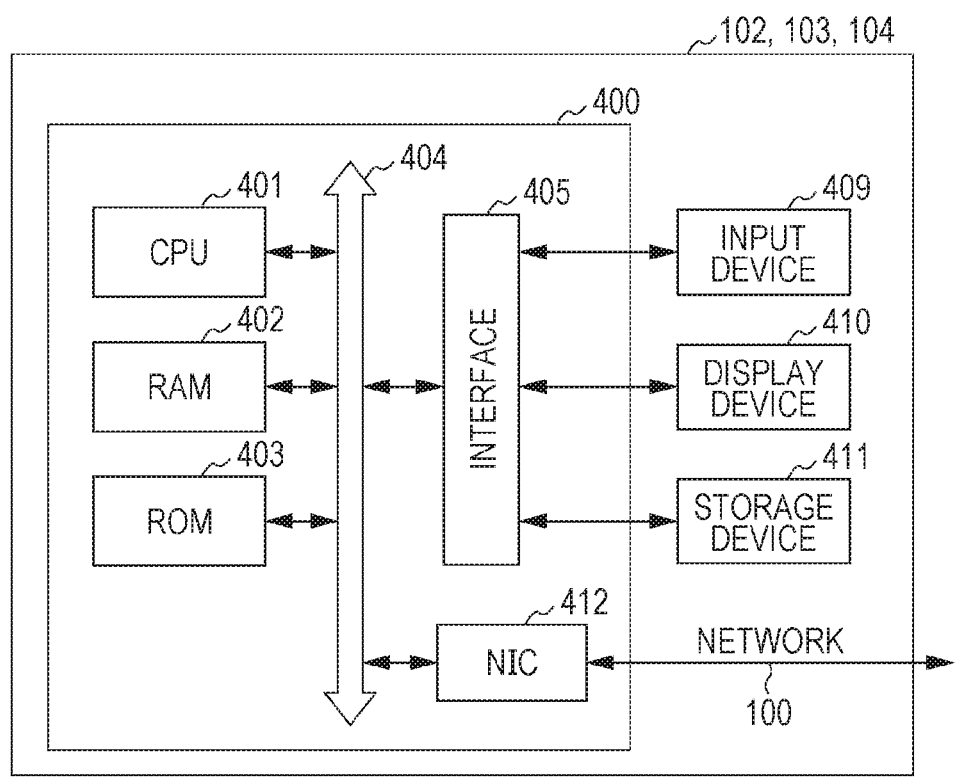
FIG. 4A is a diagram illustrating the hardware configuration of a client device.
FIG. 4B is a diagram illustrating the software configuration of the client device.

The hardware of the client devices (102, 103, and 104) will be described. FIG. 4A is a diagram illustrating the hardware configuration of the client device (102, 103, or 104). As illustrated in FIG. 4A, the client device (102, 103, or 104) includes a controller 400, a display device 410, an input device 409, and a storage device 411.

The display device 410 is a device serving as a display for displaying information to the user. An example of the display device 410 is a liquid crystal display.

The input device 409 is a device serving as an input device for accepting user operation. Examples of the input device 317 include, for the PCs (102 and 103), a mouse and a keyboard, and for the mobile terminal 104, a touch sensor for a touch screen.

The storage device 411 is a non-volatile memory for storing a large volume of information. Examples of the storage device 411 include an HDD and an SSD. The storage device 309 stores job data, such as print data, setting information, system programs, and application programs.

The controller 400 is a control device that controls the devices of the client device (102, 103, or 104) in an integrated manner. The controller 400 includes a CPU 401, a ROM 403, a RAM 402, a NIC 412, and an interface 405. These components are connected so as to communicate with each other by a system bus 404.

The CPU 401 is a processor that executes various processes based on commands described in programs. The CPU 401 implements various functions by controlling the devices of the client device (102, 103, or 104) by executing the various programs described later.

The ROM 103 is a read only memory. The ROM 403 stores programs for the boot sequence and font information, the above programs, and other various programs. The programs stored in the ROM 403 are read by the CPU 401.

The RAM 402 is a readable and writable memory. The RAM 402 functions as a main memory and a work area for the CPU 401. The RAM 402 stores image data to be temporarily used, a decompressed program, and various kinds of setting information.

The NIC 412 is a communication interface for communicating with an external device through the network 100. The NIC 412 may be a wired communication interface or a wireless communication interface. The NIC 412 may also be used to transmit and receive image data to and from an external device.

The interface 405 is a device interface for inputting and outputting information to and from each device. Although the present embodiment describes one interface for simplicity, the interface may be provided for each device. The interface 405 outputs a control command and screen information to the display device 410 and receives an input of the result of user operation from the input device 409. The interface 314 outputs a control command and write target data to the storage device 411 and receives an input of read target data from the storage device 411.

In FIG. 4A, the CPU 401 executes programs stored in a program ROM of the ROM 403 and programs of the OS and general applications loaded on the RAM 402 from the storage device 411. The ROM 403 further includes a font ROM and a data ROM. The RAM 402 functions as a main memory and a work area for the CPU 401.

Client Software

The software of the client devices (102, 103, and 104) will be described. FIG. 4B is a diagram illustrating the software configuration of the client device (102, 103, or 104). These programs are stored in the ROM 403 or the storage device 411 and are read by the CPU 401 for execution.

A boot loader 451 includes programs to be executed immediately after the power of the client device (102, 103, or 104) is turned on. These programs include programs for executing various start-up sequences necessary to start the system.

An operating system 452 is a program for providing execution environments for various programs for implementing the functions of the client device (102, 103, or 104). The operating system 452 mainly provides the function of management of the resources of the client device (102, 103, or 104), such as the ROM 403, the RAM 402, and the storage device 411.

A network control program 453 is a program to be executed in transmitting and receiving data to and from a device connected through the network 100.

A remote file system (client) 454 is a client program for accessing a file server provided by the file system (server) 354. As a result of accessing the file server, file operations, such as moving and copying files in the external device, can be executed. The remote file system (client) 454 uses the network control program 453 in communication involved in file operations.

A web browser 455 is an application program for accessing WEB contents through the network 100. If JavaScript is available, any type of general web browser can be used. The web browser 455 functions as a client program in using a web service provided by the web server 355.

A local file system 456 is a file-management functional program for executing file management, such as creation, edition, and deletion of various files stored in the storage device 411. This allows data management in a file format and a drag and drip operation on a file specified by a mouse pointer or the like. The local file system 456 allows file operation through the network 100 in conjunction with the remote file system (client) 454. Examples include accessing the file system (server) 354 to copy files managed by the local file system 456 to a remote device. Another example is copying the files in the remote device to the local file system 456.

Although other programs 457 include programs other than the above programs, detailed descriptions thereof will be omitted.

Correspondence Relationship Between System and Devices

In the present embodiment, the printing system 1 illustrated in FIG. 2 is implemented using the configurations illustrated in FIGS. 3A and 3B and FIGS. 4A and 4B. The correspondence relationship is as follows.

The operation unit 153 is implemented by the controller 400, the display device 410, the input device 409, the web browser 455, the local file system 456, and the remote file system (client) 454.

The web server 154 is implemented by the controller 300 and the web server 355.

The file system 155 is implemented by the controller 300, the file system (server) 354, and the network control program 353.

The printing unit 214 is implemented by the printing device 303 and the sheet processing device 310.

The hot-folder function unit 221 is implemented by the controller 300 and the hot folder function program 356.

The job execution unit 216 is implemented by the controller 300, the JDF function program 357, and the PDL print function program 358.

The job managing unit 226 is implemented by the controller 300 and the print-job-queue management program 361.

The authentication unit 204 is implemented by the controller 300 and the user authentication program 360.

A storage area that stores the user DB 205, the PDF file 212, and the JDF file 213 is implemented by the storage device 309.

Internal Hot Holder

Figure 5A:
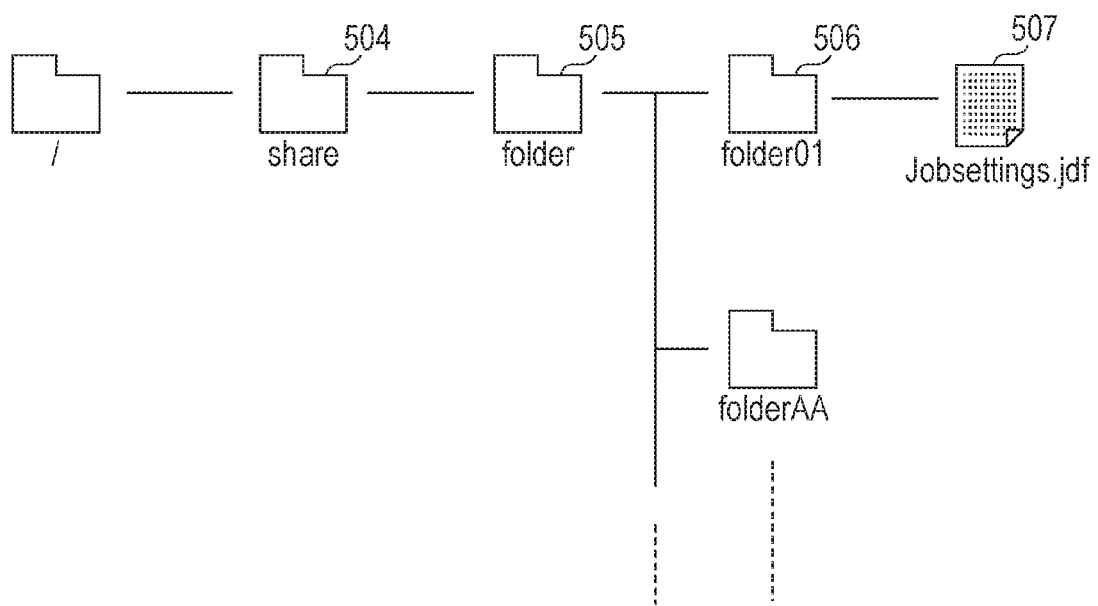
FIG. 5A is a diagram illustrating the hierarchical structure of the usage environment of the internal hot folder.

Next, the details of the internal hot folder will be described. FIG. 5A is a diagram illustrating the hierarchical structure of the usage environment of the internal hot folder. FIG. 5B is a diagram illustrating the file system of the internal hot folder.

As described above, the printer 101 provides the function of the file system 155 by executing the file system (server) 354. FIG. 5A illustrates a folder hierarchy under the control of the file system (server) 354.

FIG. 5A illustrates the hierarchical relationship among the hierarchies to "share/folder/folder01" (506), which is a hot folder, as a path from the root folder. The left in FIG. 5A is the higher level of the folder hierarchy, and the right is the lower level. As illustrated in FIG. 5A, a print setting file 507 is disposed under the share/folder/folder01" (506) that is a hot folder.

A folder 504 is a folder named "share" and is positioned at the uppermost hierarchy of the open folders. A folder 505 is a folder named "folder" and is positioned lower than the folder 504. The folder 506 is a folder named "folder01" and is positioned lower than the folder 505. This shows that the folder 506 stores the job setting file 507, which shows that the folder 506 is a hot folder. Also in the client device (102, 103, or 104), when the remote file system (client) 454 is executed, a browser screen 550 is displayed. When the PDF file 212 is stored under "folder01", with the directory monitoring unit 222 enabled, the PDF file 212 is detected by regular monitoring (for example, at intervals of one minute). Then, image formation based on the PDF file 212 is executed in the printer 101 using the internal hot folder function.

The present embodiment uses a JDF-format file as the internal print setting file. In other words, the present embodiment assumes a form in which the JDF function program 357 is used in print-processing print target data input via the hot folder function program 356. The format of the internal print setting file may not be the JDF-format file. Thus, the print job may not be necessarily executed using the JDF function program 357. The JDF-format file may be however used because of the following various merits. The JDF-format file can be manually edited as a format of a print setting file. The JDF-format file is in widespread use as an industry standard print setting format. Many experts in JDF-related art are present in printing equipment vendors and integrators.

WEB Screen

Next, a case in which the internal hot folder function is used on a WEB screen will be described.

The function of the WEB screen will be described from a state in which the folder 506 and the job setting file 507 have not been created.

As described above, the printing system 1 has a configuration in which the hot-folder function unit 221 and the web server 154 are associated with each other. For this reason, as a result of displaying a WEB page provided by the web server 154 using the web browser 455, the client device (102, 103, or 104) functions as the operation unit 153 of the internal hot folder function. Processes that are available using a WEB page provided by the web server 154 include login processing, folder-hierarchy shifting processing, folder creation processing, print-setting registration processing, print-setting confirmation processing, and print-file input processing. The details of the WEB page in each process will be described hereinbelow.

When the hot folder function program 356 is accessed using the web browser 455, a login screen 600 illustrated in FIG. 6A is displayed. FIG. 6A is a diagram illustrating the login screen of the WEB page.

The login screen 600 is a screen that requests a user who accesses the WEB page to input authentication information (user name and password) so as to authenticate the user. The login screen 600 includes a user-name input field 601, a password input field 602 corresponding to the user name, a login-destination selection field 603, and a login start button 604. When the user of the hot folder function program selects the login start button 604 after appropriately inputting user information in each field, authentication processing is executed according to the user authentication program 360. Authentication information necessary for the authentication processing of the user authentication program 360 is transmitted from the web browser 455 to the user authentication program 360 via the web server 355 of the printer 101 through the network 100. The login-destination selection field 603 allows selecting a server to be used in authentication.

Figure 6B:
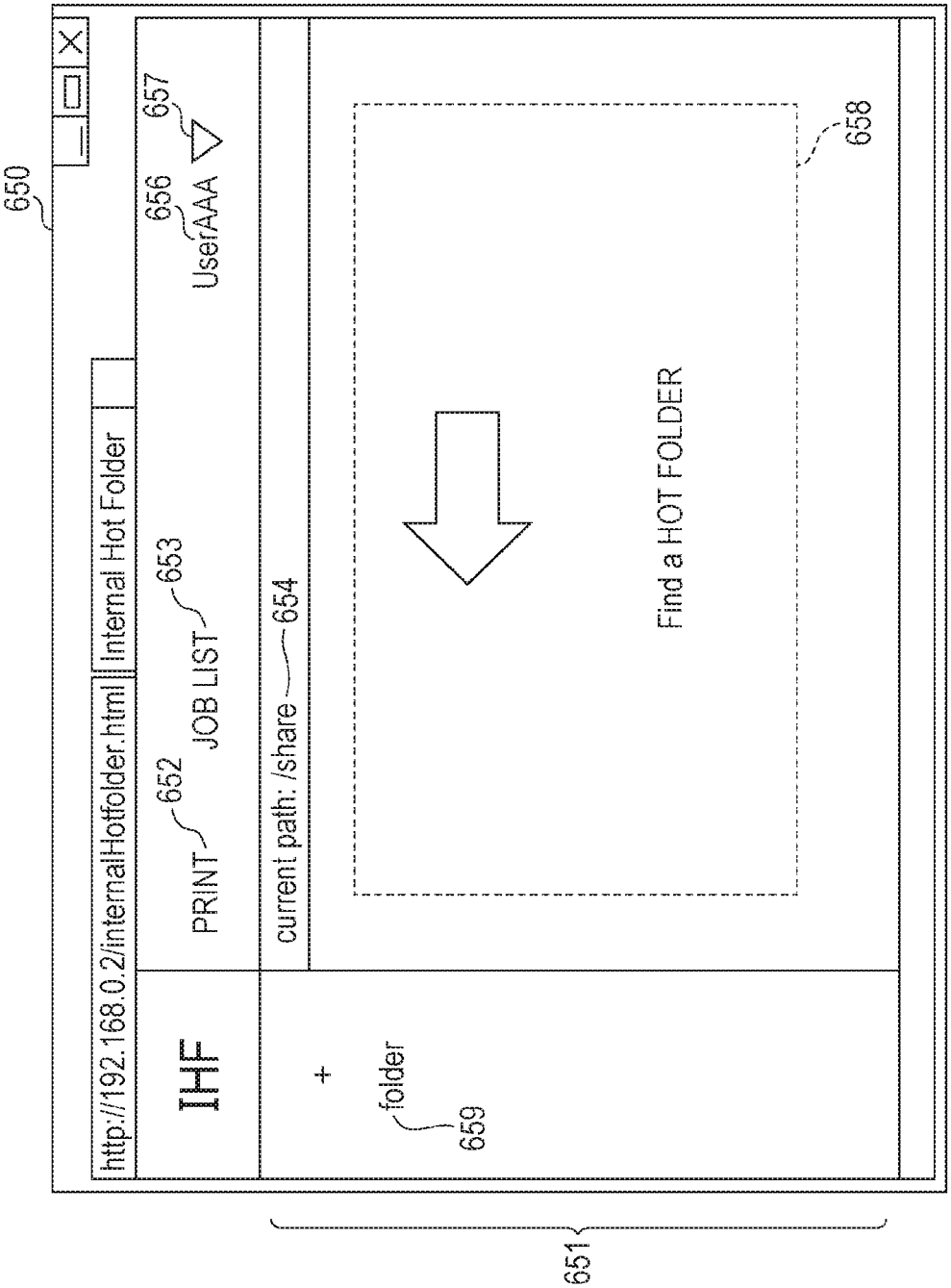
FIG. 6B is a diagram illustrating the basic screen of the WEB page.

After the login on the login screen 600 is completed, a basic screen 650 illustrated in FIG. 6B is displayed. FIG. 6B is a diagram illustrating the basic screen of the WEB page.

The basic screen 650 is a screen displayed first after the login. In the present embodiment, the basic screen is a screen related to the folder 504, which is the top hierarchy folder (root folder) of the open folders. The basic screen 650 includes a folder operating area 651, a print-function selection button 652, a job-list display button 653, a current-path display area 654, a login-user display area 656, a user-specific-function selection button 657, and a page-function display area 658.

The folder operating area 651 is an area in which information is displayed in cooperation with directory information under the control of the file system (server) 354. In the basic screen 650, a folder specification button 659 is disposed in the folder operating area 651. The folder specification button 659 is used to shift the current path to the folder 505 which is lower than the folder 504. When the current path is shifted, the screen is updated according to the information on the destination folder.

The print-function selection button 652 is a button to be selected in using a hot folder printing function among a plurality of functions available on the WEB page. When the print-function selection button 652 is selected, the basic screen 650 is displayed. In other words, the print-function selection button 652 is not used on the basic screen 650 but is used on another screen. In the present embodiment, the print-function selection button 652 is disposed also on the basic screen 650 for unification of the page design.

The job-list display button 653 is used to display a list of input print jobs.

The current-path display area 654 is an area that displays the current path in an absolute path format from the root folder. FIG. 6B shows that the current path is "/share".

The login-user display area 656 is an area in which the user name of the user authenticated on the login screen 600.

The user-specific-function selection button 657 is used to check the customize setting of the login user displayed in the login-user display area 656.

The page-function display area 658 is an area in which information is displayed according a function available in the current path indicated in the current-path display area 654. If the current path is "/share", the present embodiment does not permit creation of a hot folder. Thus, the page-function display area 658 displays a message to shift to a folder to be used as a hot folder from the folder operating area 651.

Figure 7A:
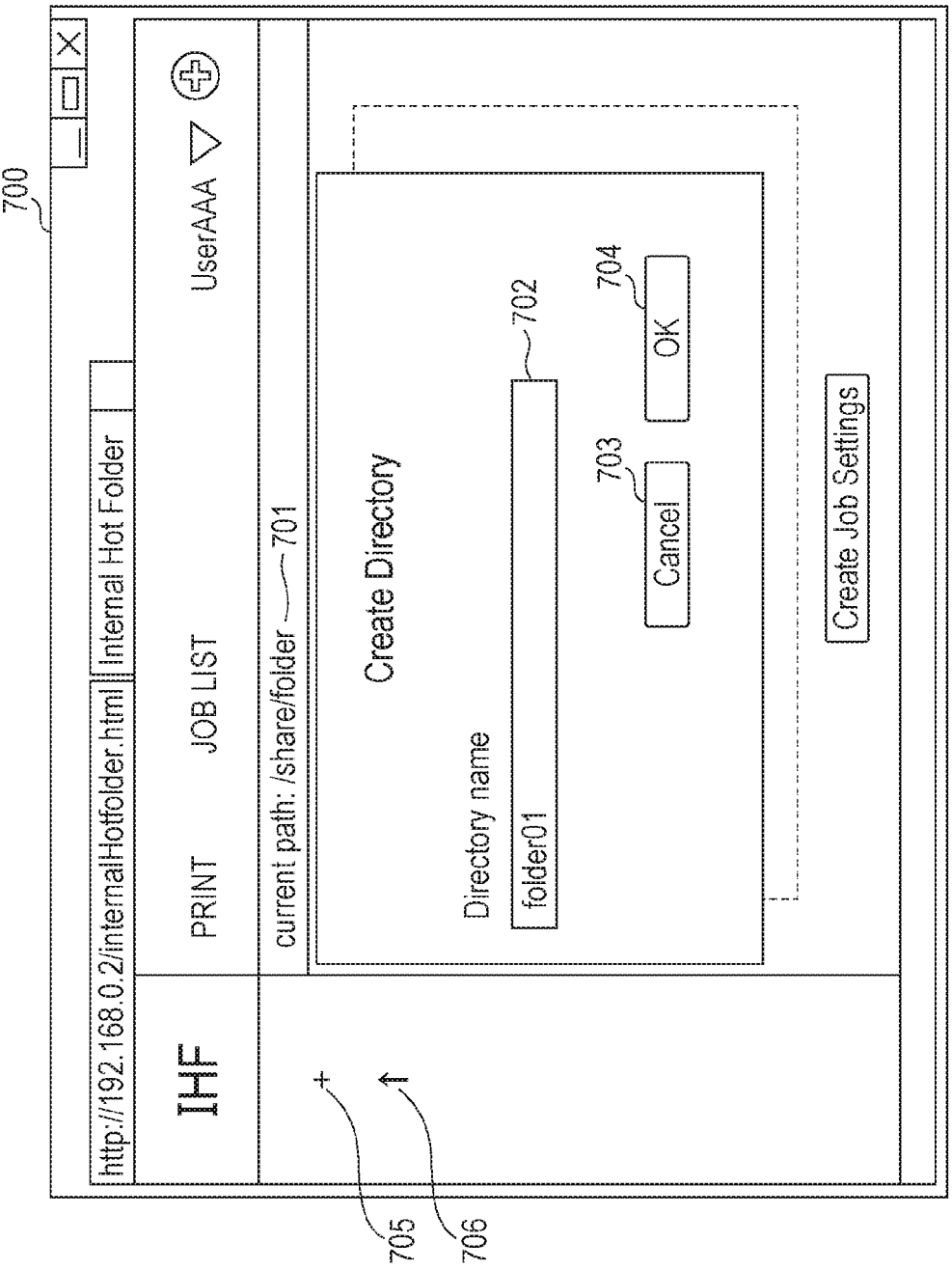
FIG. 7A is a diagram illustrating a folder creation screen of the WEB page.

If the folder specification button 659 is selected on the basic screen 650, the current path shifts to "/share/folder". FIG. 7A illustrates how to indicate creation of a new folder in this state. FIG. 7A is a diagram illustrating a folder creation screen of the WEB page.

The folder creation screen 700 includes a current-path display area 701, a name entry field 702, a cancel button 703, an OK button 704, a folder creation button 705, and a higher-level shift button 706.

Selecting the higher-level shift button 706 allows the user to display information on the folders on the left of the hierarchy chart in FIG. 5A, that is, higher-level folders.

As illustrated in FIG. 7A, the current path in the current-path display area 701 indicates "/share/folder". Since a folder can be created in this folder, the folder creation button 705 is disposed in the folder operating area 651. Furthermore, since higher-level folders are present higher than this folder, the higher-level shift button 706 is disposed. The folder creation button 705 is selected when a new folder is created directly under the level of the current path. The higher-level shift button 706 is used to shift the level of the displayed information to a level higher than the current path.

When the folder creation button 705 is selected, a pop-up window for creating a new folder is displayed. The pop-up window includes the name entry field 702, the cancel button 703, and the OK button 704.

The name entry field 702 is used to enter the name of a new folder. When the name entry field 702 is touched, a software keyboard (not illustrated) is displayed so that a character string can be input. When the OK button 704 is selected, with a character string input in the name entry field 702, a folder with the name input in the name entry field 702 is created directly under the current path. Thus, a button indicating "folder01" is added to the folder operating area 651. Selecting "folder01" allows displaying information on the folders on the right in FIG. 5A, that is, lower level folders. Using the folder creation button 705 allows creating a subfolder, like "folderAA" 657 in FIG. 5A.

When the cancel button 703 is pressed, the folder creation processing is not executed, and the pop-up window is closed.

Figure 7B:
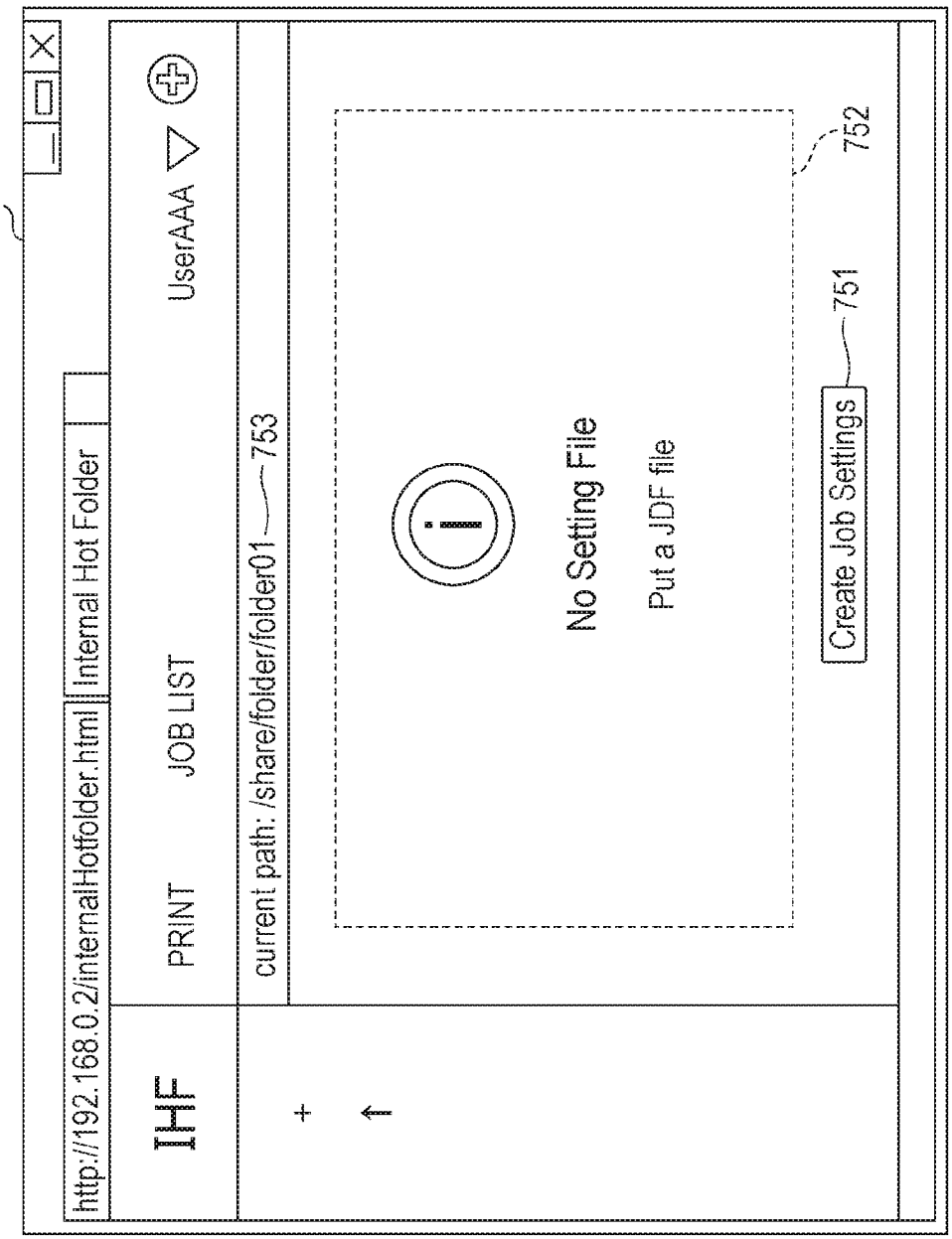
FIG. 7B is a diagram illustrating a non-hot-folder screen of the WEB page.

When the "folder01" button in the folder operating area 651 is pressed after the folder is created, a screen 750 illustrated in FIG. 7B is displayed. FIG. 7B is a diagram illustrating a non-hot-folder screen of the WEB page. In FIG. 7B, the current path in the current-path display area 753 is "/share/folder/folder01". This folder is a folder to which a hot folder can be set. Thus, a page-function display area 752 and a job-setting creation button 751 are displayed.

The page-function display area 752 shows that a hot folder can be set to the current path and that no hot folder has been set to the folder.

The job-setting creation button 751 is used to give an instruction to dispose a setting file so as to use the current path as a hot folder. The job-setting creation button 751 may not be used, and instead, a JDF file may be directly disposed to the current path using a file system. When the job-setting creation button 751 is selected, print setting screens 800 and 850 are displayed.

Figure 8A:
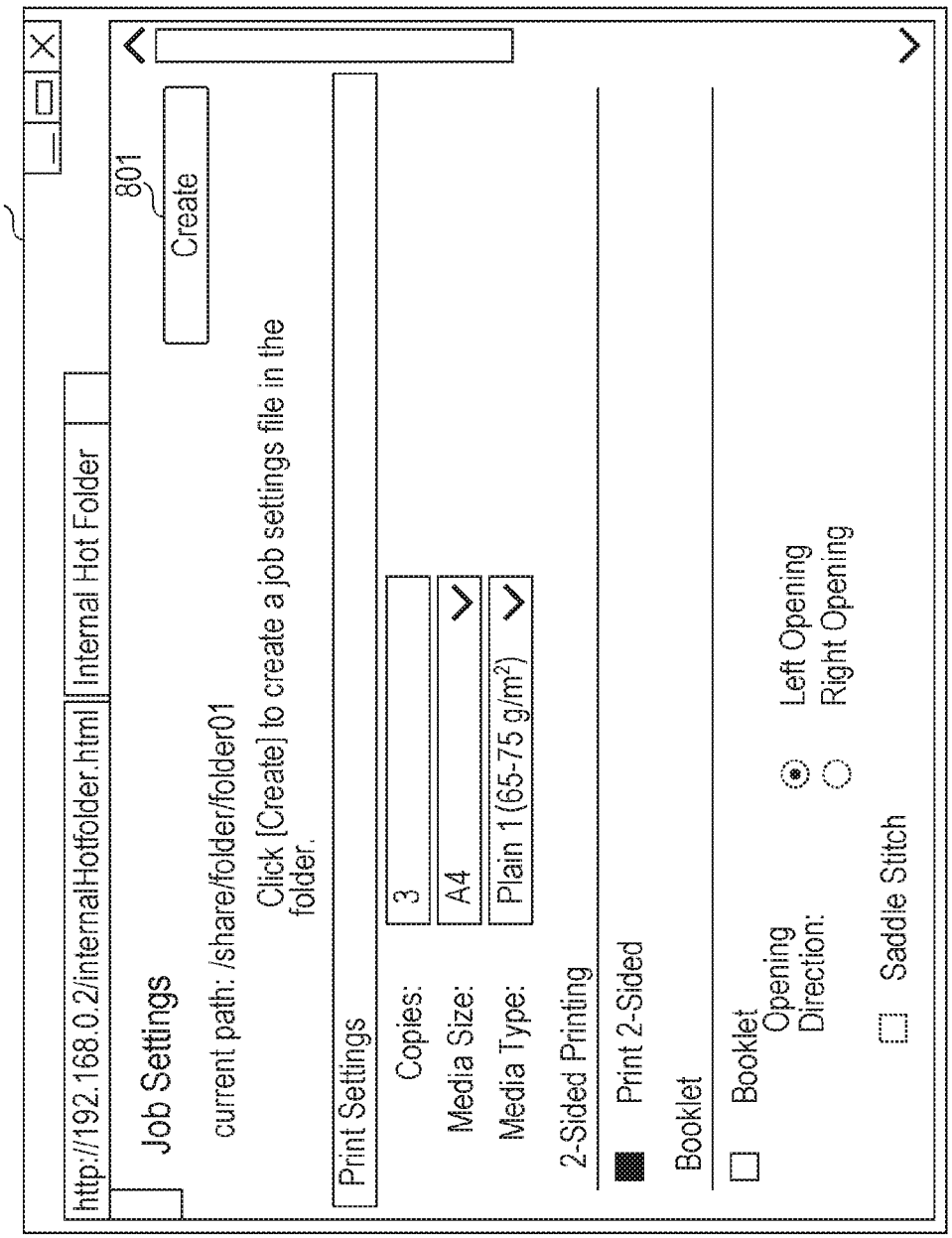
FIG. 8A is a diagram illustrating a print setting screen (top) of the WEB page.
Figure 8B:
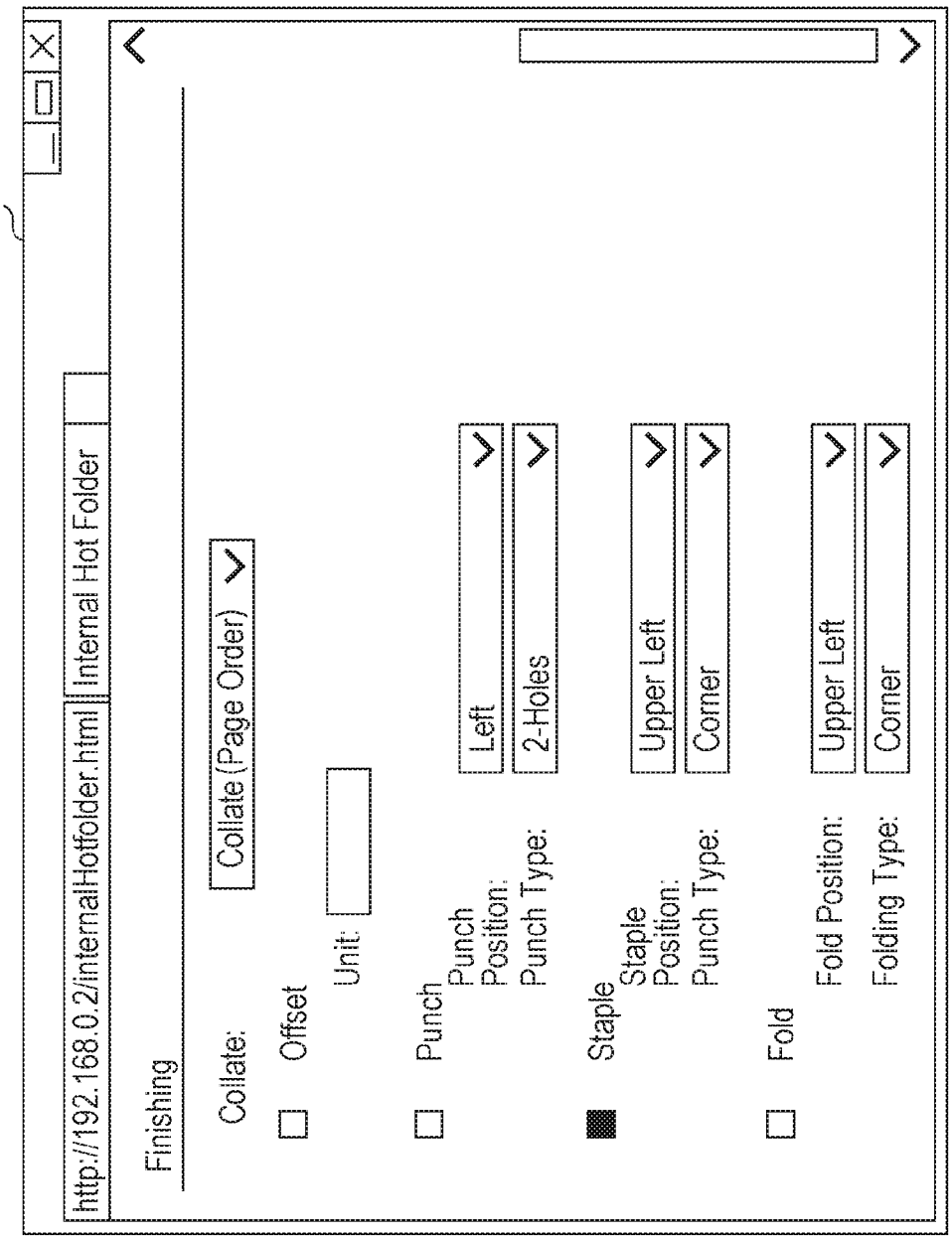
FIG. 8B is a diagram illustrating a print setting screen (bottom) of the WEB page.

FIG. 8A is a diagram illustrating a print setting screen (top) of the WEB page. FIG. 8B is a diagram illustrating a print setting screen (bottom) of the WEB page.

FIGS. 8A and 8B illustrate a screen displayed immediately after the job-setting creation button 751 is selected in a state in which the information displayed on the web browser screen is as illustrated in FIG. 7B. As illustrated, the screen includes function selection buttons and selection boxes for selecting applicable settings at the time of creating a product as the hot folder function of the printer 101. FIGS. 8A and 8B illustrate part of the screen scrolled because of limitation on the display area of the web browser screen, but in practice, the web browser screen can be displayed as a single screen. Specifically, the web browser screen can be displayed as a single screen by changing the display window size or decreasing the display character size. Since these functions and operations are general screen control methods for the web browser function, detailed descriptions will be omitted.

As illustrated in the examples in FIGS. 8A and 8B, there are various print setting items associated with the hot folder via the web browser screen. Examples of the basic functions include color or monochrome, the number of copies, sheet size in printing, sheet type, and printing side (one-sided or two-sided). Bookbinding-related settings include whether to perform bookbinding, the opening direction of the booklet, and weather to perform saddle stitching in bookbinding. Output mode specifications include a sort mode, sorting-out during ejection of multiple copies (shift discharge), and multi-copy at shift discharge. Examples of setting items associated with the hot folder of the printer 101 in the present embodiment include finishing processing, such as punching, stapling, and folding. However, various functions of the printer 101 other than the functions illustrated in FIGS. 8A and 8B may be specified. Examples include various kinds of image processing and finishing processing not illustrated in FIGS. 8A and 8B. These functions may be added as available items when requested by the user of the hot folder and may be stored in a JDF format so as to be applicable at printing. In other words, any items that can be processed by the printer 101 may be associated with the hot folder setting using a screen corresponding to the screen in FIGS. 8A and 8B.

Figure 12A:
FIG. 12A is a diagram illustrating the configuration of print setting data.

When the various settings are entered on the print setting screens 800 and 850 and thereafter a setting completion button 801 is selected, the setting is completed. Upon completion of the setting, the web browser executes processing for converting the input setting information to XML-format data. Extensible markup language (XML) is a markup language. This processing is implemented using, for example, a JavaScript which is a web program. An example of the XML-format data is illustrated in FIG. 12A. FIG. 12A is a diagram illustrating the configuration of print setting data. Although print setting information in the present embodiment is described in the XML format, any format in which the details of the print setting items can be stored may be used.

The XML data 1200 includes a plurality of parts, that is, an XML declaration part 1206, a metadata part 1207, a general print setting part 1208, and a binding setting part 1209. The XML declaration part 1206 is a description that is absolutely necessary to indicate that the data format is XML. The metadata part 1207 is a part in which information on the target folder is described. In the illustrated example, the metadata part 1207 describes address information or path information on the folder to which print settings are applied. The general print setting part 1208 describes information on the sheets to be used in printing, the number of copies, and a method of discharge. The binding setting part 1209 describes, for example, a print side, the order and the number of print sides. The content of the general print setting part 1208 increases or decreases depending on the specified print settings. For example, if staple setting or folding setting is specified, information corresponding to the staple setting part or the folding setting part is added.

The XML data 1200 contains, in addition to the print setting information, address information 1204 corresponding to the path of the folder for which the print settings are to be created.

The created XML data 1200 is transmitted to the web server 355 and is then transferred to the hot folder function program 356. A JDF file is created based on the XML data and is disposed on the current path based on the address information 1204. Upon completion of the above processing, a screen 900 illustrated in FIG. 9A is displayed. FIG. 9A is a diagram illustrating the hot folder screen of the WEB page.

The screen 900 includes a page-function display area 901 and a job-setting confirmation button 902.

The page-function display area 901 indicates that the current path is "hot folder". In other words, a print setting file (the job setting file 507) is disposed on the current path.

Figure 9B:
FIG. 9B is a diagram illustrating the print-setting confirmation screen of the WEB page.

The job-setting confirmation button 902 is used to confirm print settings set on the current path. When the job-setting confirmation button 902 is selected, a screen 950 is displayed. FIG. 9B is a diagram illustrating the print-setting confirmation screen of the WEB page.

As illustrated, the screen 950 presents information for confirming the details of the print settings set on the web browser screen in FIGS. 8A and 8B. The print setting information presented in FIG. 9B is substantially the same as the details described in the job setting file 507 stored in the current path. However, the use of the web browser allows display with high readability.

When the job setting file 507 is opened using a program, such as an editor, running on the client device (102, 103, or 104), the internal information can be confirmed as illustrated in FIG. 12B. FIG. 12B is a diagram illustrating the configuration of the JDF file. However, this method is difficult for users who do not know the format and the structure of the JDF file. For this reason, the details of the print settings may be confirmed via the web browser using a simpler method for the users, as in the present embodiment.

Figure 10A:
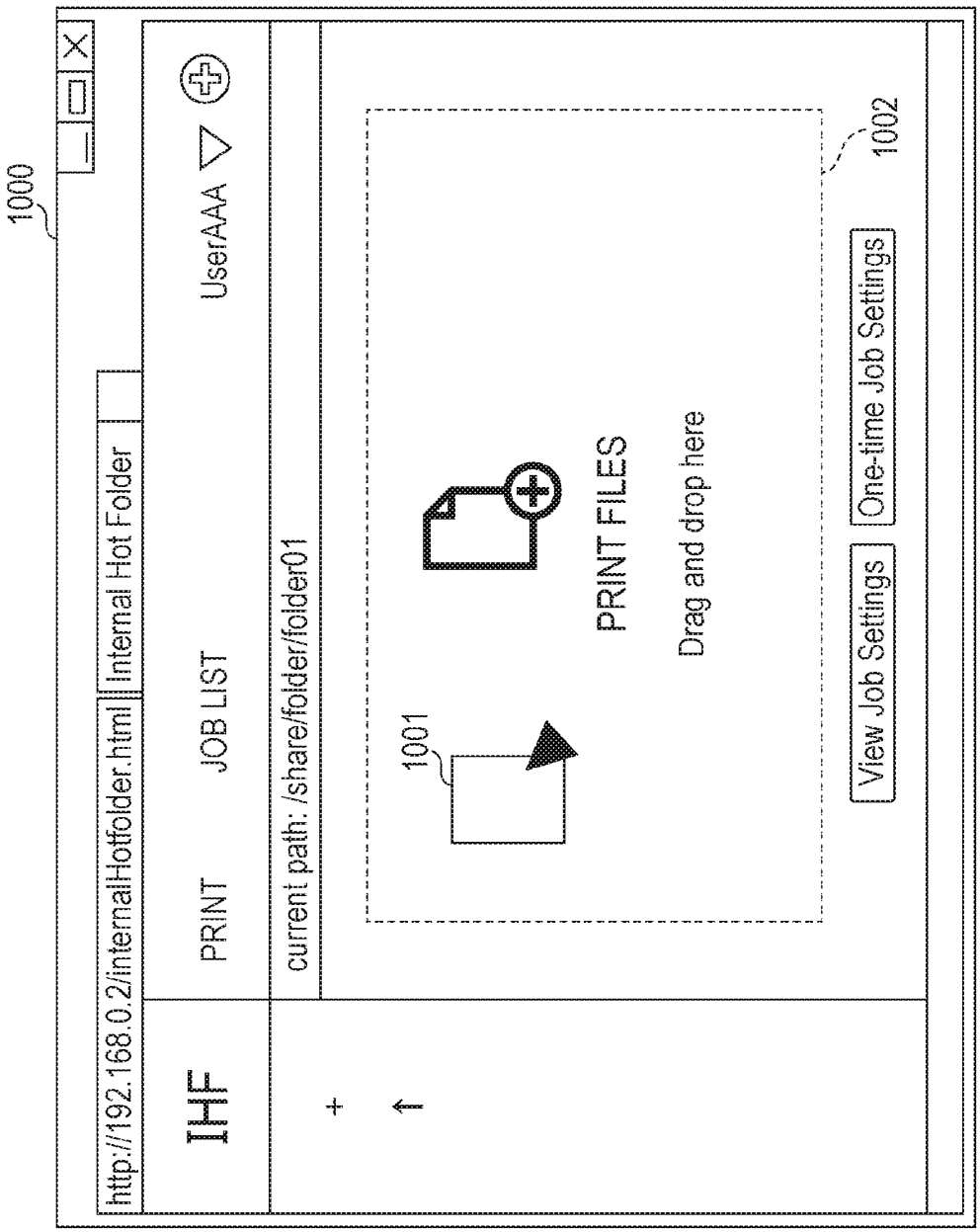
FIG. 10A is a diagram illustrating how a file is input to the hot folder on the WEB page.

As described above, in the screen 900, the current path is "hot folder". This allows a print file input operation on this screen 900. FIG. 10A is a diagram illustrating how a file is input to the hot folder on the WEB page.

This diagram illustrates a state in which print target file managed by the file system in the client device (102, 103, or 104) is selected using an operating device, such as a mouse, and is moved (dragged) onto a screen 1000 displayed by the web browser 455. In this state, an icon 1001 is displayed in a page-function display area 1002. When the drag is released (dropped) in this state, the print target file is read by the web browser 455. Thus, the print file for use in print processing is specified. In other words, the screen 900 functions as a print file specification screen. The web browser 455 executes a JavaScript program to cause the page-function display area 1002 as a file-input detection area. This allows the processing for detecting the dropped file and transmitting the file to the hot folder function program 356 of the printer 101 via the web server 355. In other words, the present embodiment implements an intuitive file input operation using drag-and-drop specific to the hot folder using a general-purpose application, such as a web browser.

Figure 10B:
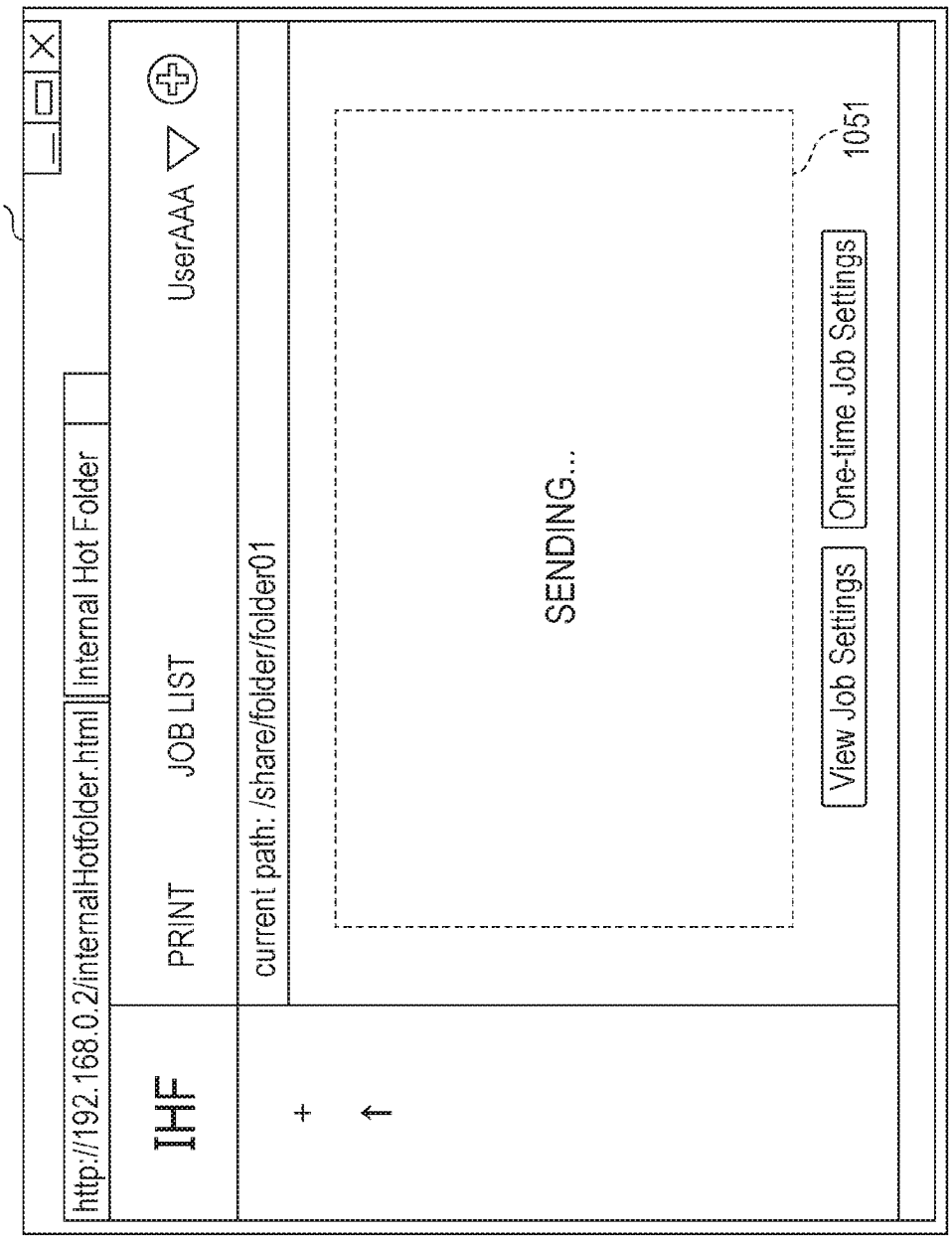
FIG. 10B is a diagram illustrating a WEB page screen after the file is input.

When the web browser 455 detects an input of the file and starts to transmit the print target file, the screen 1000 shifts to a screen 1050. FIG. 10B is a diagram illustrating a WEB page screen after the file is input.

As illustrated, a page-function display area 1051 of the screen 1050 presents a message "SENDING" indicating that the file is being transmitted. Upon completion of the file transmission processing, the message changes to "COMPLETE". After time passes farther, the screen 1051 shifts to the screen 900.

Figure 11:
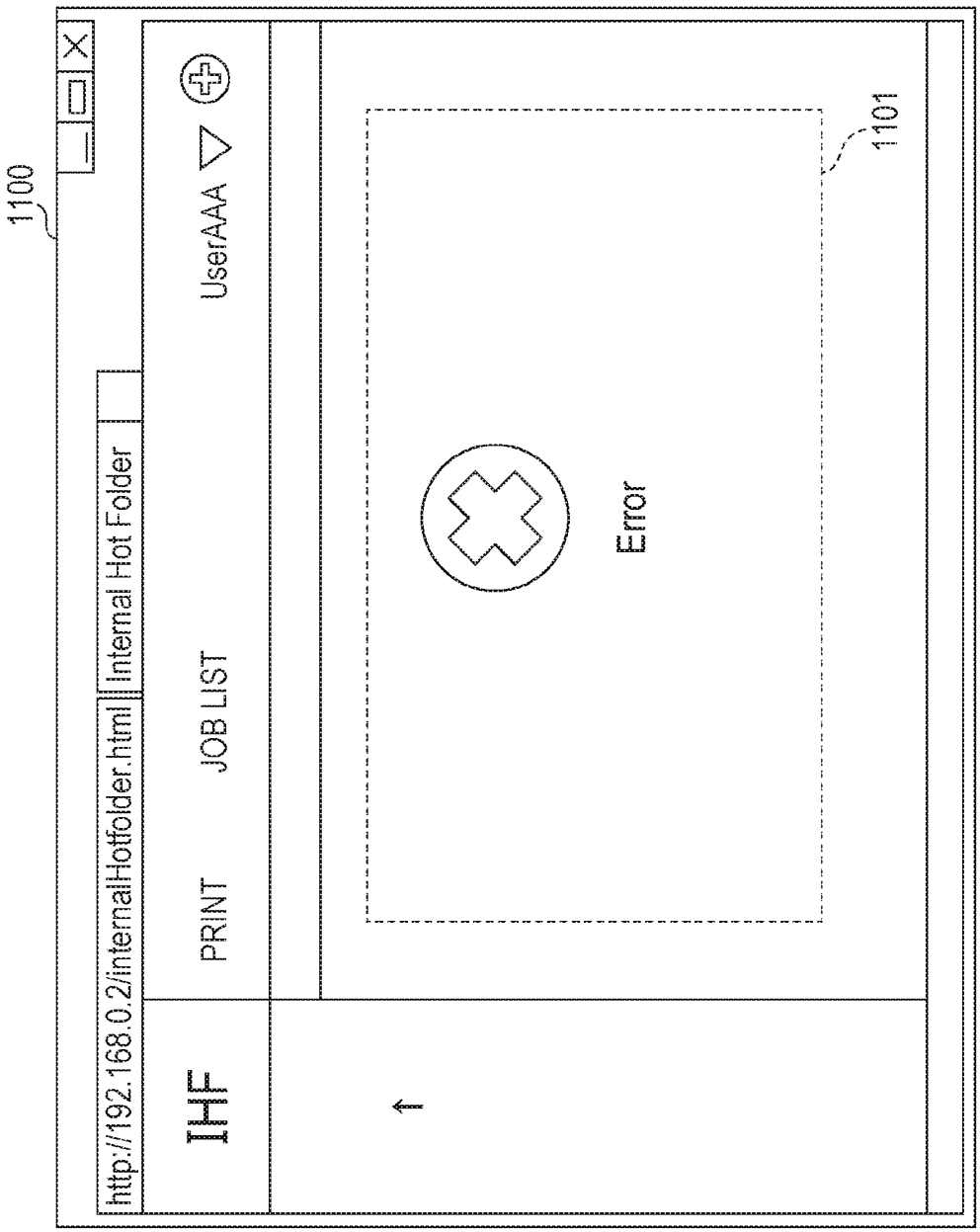
FIG. 11 is a diagram illustrating the error screen of the WEB page.

In normal operation, the screen shifts as follows. In contrast, in abnormal operation, an error screen 1100 is displayed. FIG. 11 is a diagram illustrating the error screen of the WEB page. The error screen 1100 includes a page-function display area 1101. The page-function display area 1101 presents an error message indicating that desired processing could not performed due to an unexpected situation.

The above error can occur, for example, in the following case: There is no folder in the hierarchy destination. There is not a storage in which a newly created setting file is to be stored. The destination of the print target file is not a hot folder. The folder name of the newly created folder overlaps.

Most of the above errors can occur when a folder operation or a file operation is performed in another processing during browsing with the web browser 455. A specific example is a case in which a folder being viewed with the web browser 455 is erased by the file system. In order to cope with such a case, the present embodiment prepares the error screen.

Client Control

Figure 13:
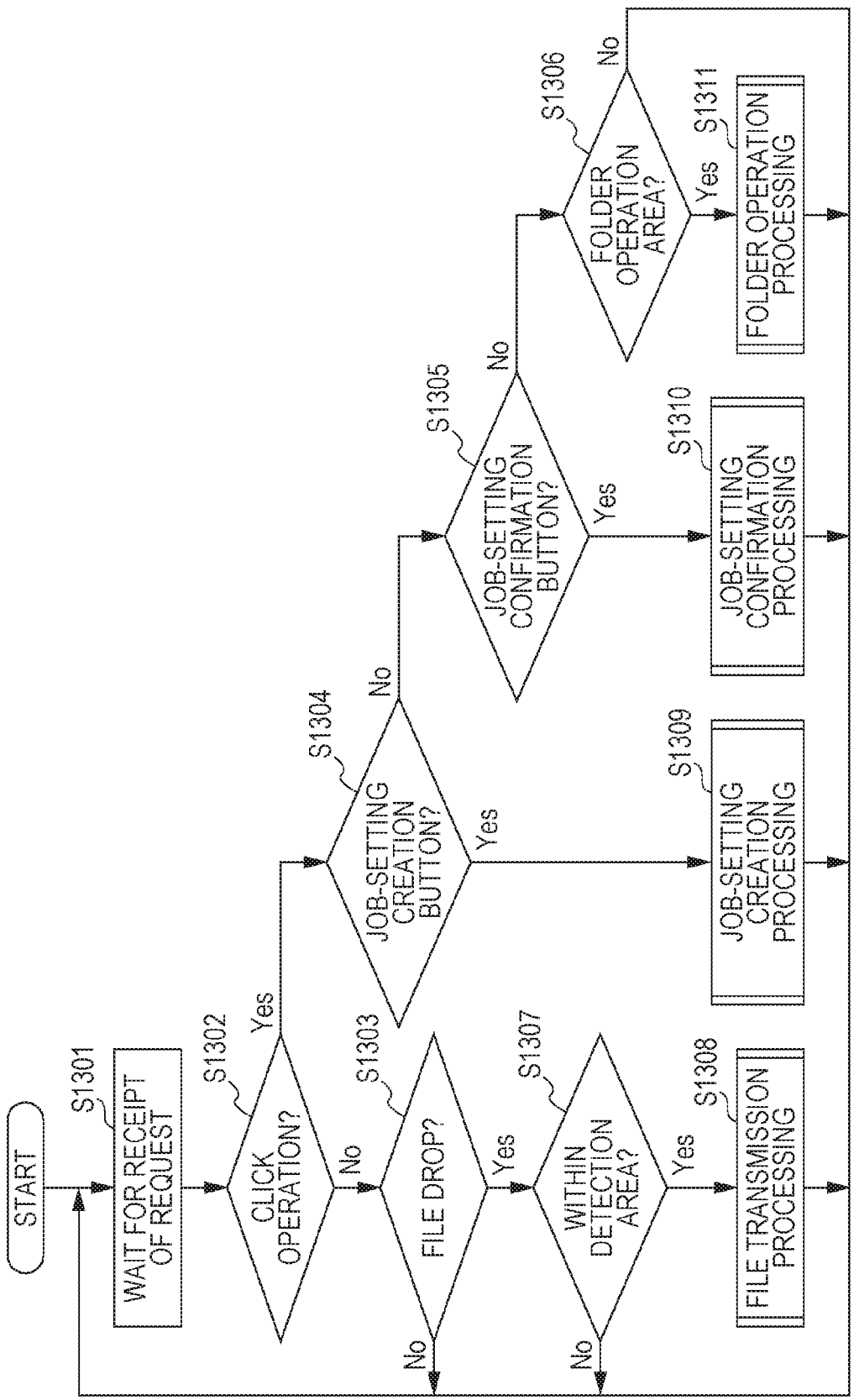
FIG. 13 is a flowchart illustrating the processing procedure of the client device that executes a web browser.

A processing procedure performed by the client device (102, 103, or 104) in using the internal hot folder function will be described. FIG. 13 is a flowchart illustrating the processing procedure of the client device (102, 103, or 104) that executes the web browser 455. The flowchart in FIG. 13 is implemented by reading the program of the web browser 455 to the RAM 402 and executing the program with the CPU 401.

The web browser 455 stays in a stand-by state until a user operation using a user interface is performed (S1301). Upon detecting a user operation, the web browser 455 proceeds to processing for determining the details of the operation.

At S1302, the web browser 455 determines whether the operation is a click on a specific point. If the determination result is "YES", the process goes to S1304, and if the determination result is "NO", the process goes to S1303.

At S1303, the web browser 455 determines whether the operation is a drop of a file to a specific point. If the determination result is "YES", the web browser 455 advances the process to S1307, and if the determination result is "NO", the operation is irrelevant to the hot folder function, and the web browser 455 ignores the operation and returns the process to S1301.

At S1307, the web browser 455 determines whether the destination of the dropped file is within a detection area. If the determination result is "YES", the web browser 455 advances the process to S1308 to execute processing for transmitting the file. If the determination result is "NO", the operation is irrelevant to the hot folder function, and the web browser 455 ignores the operation and returns the process to S1301.

At S1304, the web browser 455 determines whether the clicking is for selecting the job-setting creation button 751. If the determination result is "YES", the web browser 455 advances the process to S1309 to execute processing for creating job settings. If the determination result is "NO", the web browser 455 advance the process to S1305.

At S1305, the web browser 455 determines whether the clicking is processing for selecting the job-setting confirmation button 902. If the determination result is "YES", the web browser 455 proceeds to S1310 to execute processing for confirming job setting. If the determination result is "NO", the web browser 455 proceeds to S1306.

At S1306, the web browser 455 determines whether the clicking is processing for selecting the folder operating area 651. If the determination result is "YES", the web browser 455 advances the process to S1310 to execute processing for folder operation. If the determination result is "NO", the operation is irrelevant to the hot folder function, and the web browser 455 ignores the operation and returns to S1301.

Job Input Processing (Client)

Figure 14:
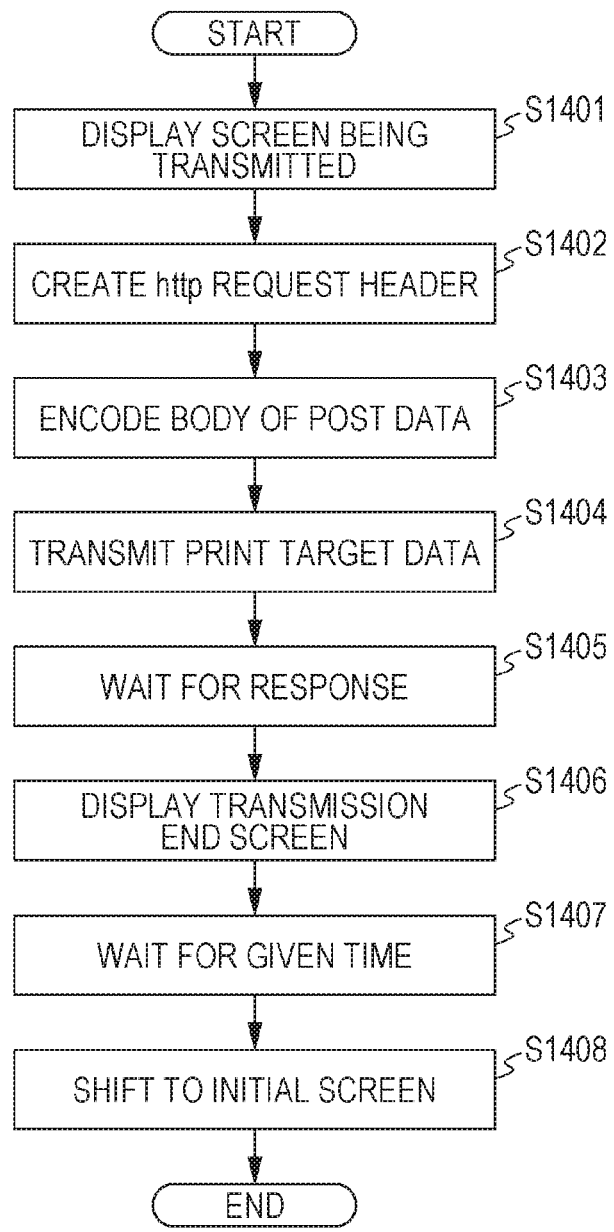
FIG. 14 is a detailed flowchart illustrating file transmission processing.
Figure 15:
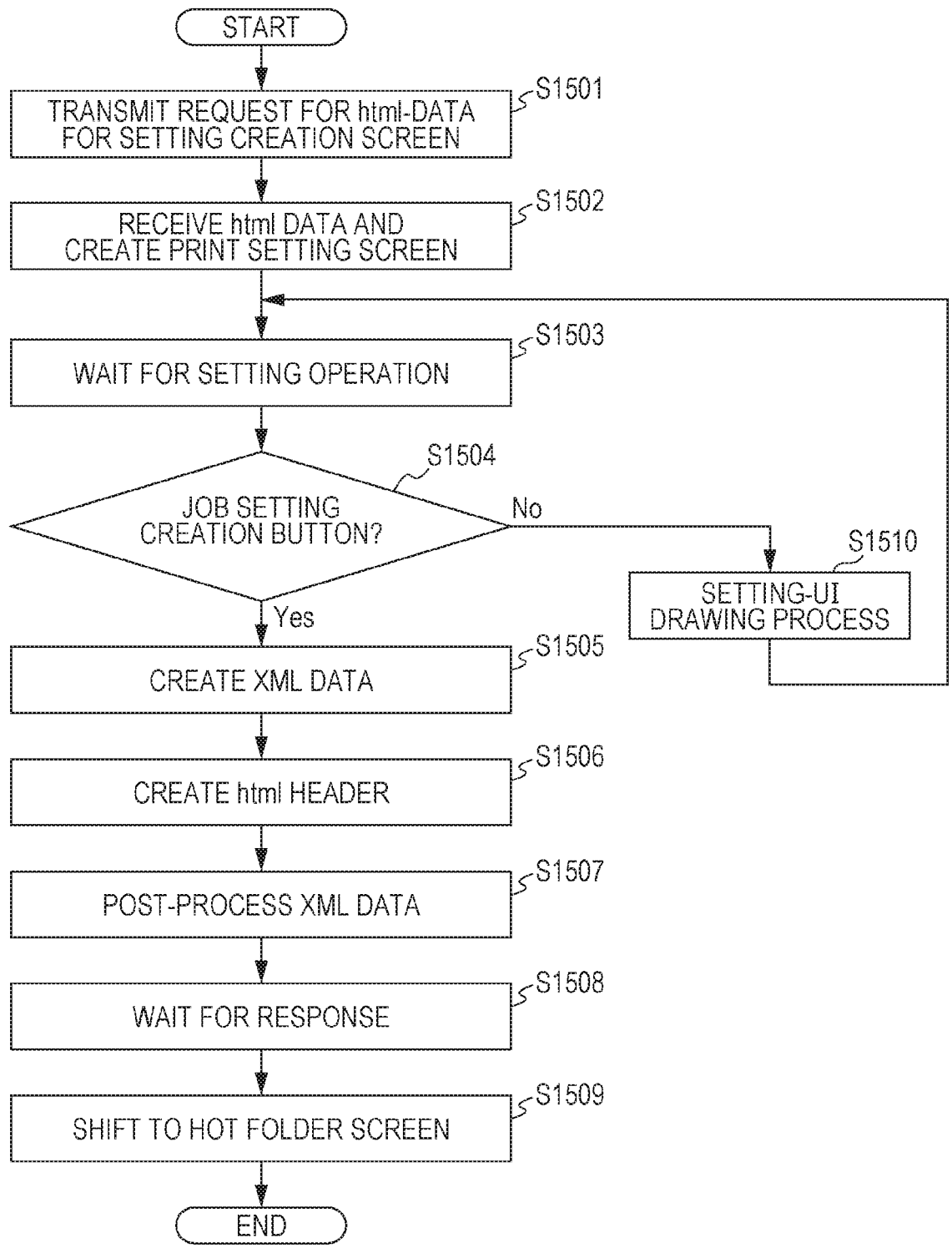
FIG. 15 is a detailed flowchart illustrating job-setting creation screen processing.

The details of the file transmission processing will be described. The job input processing at S1308 is processing to be executed after the print target file is input on the screen 1000. The file transmission processing is implemented as a result of the web browser 455 executing JavaScript provided by the web server 355. FIG. 14 is a detailed flowchart illustrating the file transmission processing.

As described above, upon detecting an input of a file, the web browser 455 causes the screen 1050 indicating that the file is being transmitted (S1401) to be displayed. The web browser 455 executes preprocessing for communicating with the web server 355. More specifically, the web browser 455 creates an http script header (S1402) and executes encode processing for transmitting print target data in the http format (S1403). An example of a command on the http when the web browser 455 transmits data to the web server 355 is a POST command.

When preparation is completed by preprocessing for communication, the web browser 455 executes the POST command. Thus, the print target data is transmitted from the web browser 455 to the web server 355 (S1404). The transmission processing at S1404 takes a finite time. The processing time differs depending on the size of the print target data, the environment of the network 100, and the processing speed of the JavaScript. Thus, whether the transmission processing has been normally completed may be determined from the result obtained from the web server 355. For this reason, the web browser 455 shifts to a stand-by state to receive the result of the data transmission processing from the web server 355 (S1405).

Upon receiving a successful completion response from the web server 355, the web browser 455 shifts the display message from "SENDING" to "COMPLETE" according to the instruction of the JavaScript (S1406). The web browser 455 waits until a predetermined time passes to ensure that the user can confirm the communication processing completion screen (S1407). After the predetermined time has passed, the web browser 455 shifts the display screen to a screen before the transmission processing is executed (for example, the screen 900).

Job-Setting Creation Processing (Client)

The details of the job-setting creation processing will be described hereinbelow. The job-setting creation processing at S1309 is executed after the job-setting creation button 751 is selected on the screen 750. The job-setting creation processing is implemented by the web browser 455 executing the JavaScript provided by the web server 355. FIG. 5 is a detailed flowchart illustrating the job-setting creation screen processing.

When the job-setting creation button 751 is selected on the screen 750, the web browser 455 transmits request data so as to request html data for displaying the print setting screens 800 and 850 from the web server 355 (S1501).

Upon receiving the html data returned in response to the request data, the web browser 455 generates the print setting screens 800 and 850 based on the html data (S1502). The displayed print setting screens 800 and 850 allow selection and input of print settings, and the web browser 455 repeatedly accepts a setting input operation until the settings are completed (S1503, 1504: NO, S1510). In other words, until the setting completion button 801 is selected at S1504, operational processing, such as selection or change of the print setting items, is executed on the display area provided by the web browser 455. At that time, the web browser 455 updates the displayed information on the setting screen according to the user's setting operation (S1510).

If the determination result at S1504 is that the setting completion button 801 is selected (S1504: YES), the web browser 455 completes reception of an input of print settings and advances the process to S1505.

At S1505, the web browser 455 creates XML data based on the print setting information and advances the process to S1506. The XML data is used to generate a JDF file at the printer 101. The configuration of the XML data is illustrated in FIG. 12A.

At S1506, the web browser 455 creates an html header and transmits the XML data to the printer 101 using a POST command (S1507). The web browser 455 waits until receiving a response to the transmission from the printer 101 (S1508).

Upon receiving the response indicating that transmission of the XML data is successfully completed from the printer 101, the web browser 455 shifts the displayed screen to a hot folder screen (for example, FIG. 9A).

Job-Setting Confirmation Processing (Client)

Figure 16:
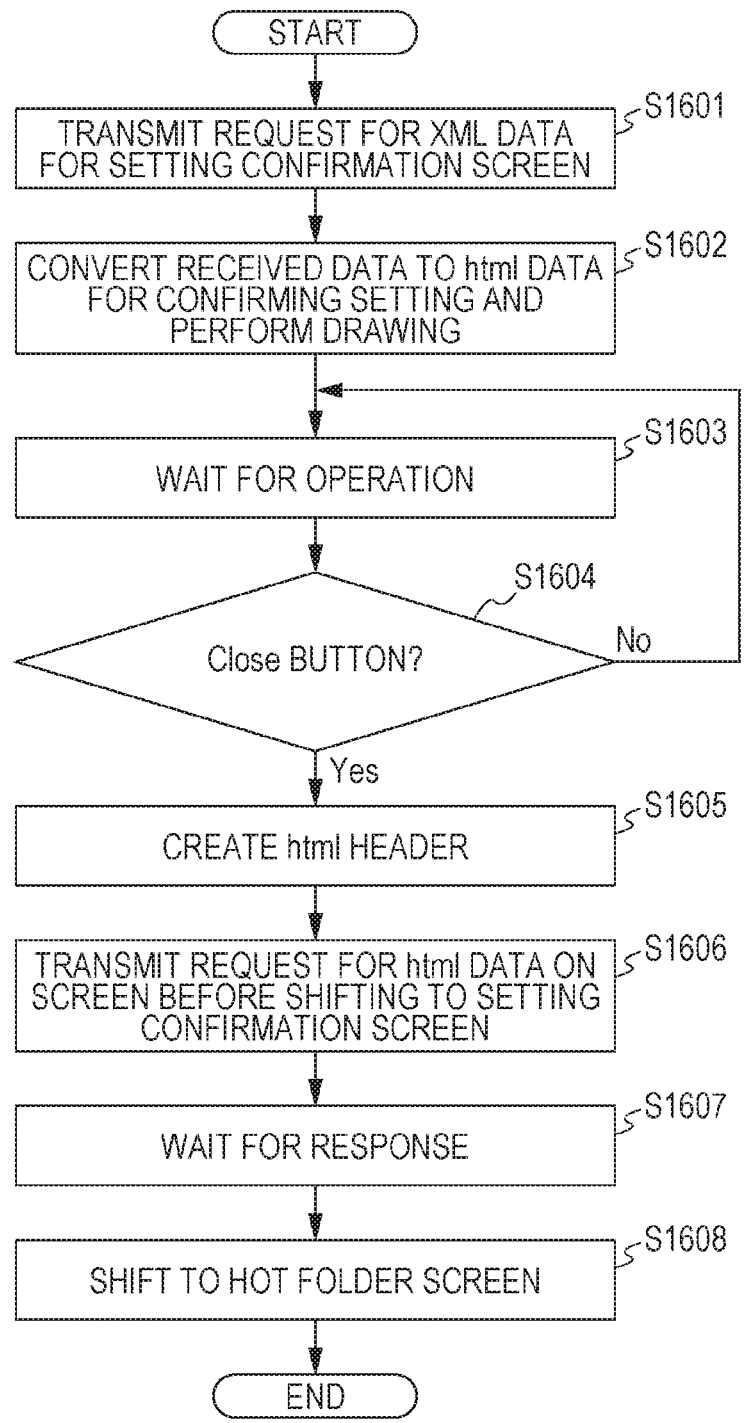
FIG. 16 is a detailed flowchart illustrating job-setting confirmation processing.

The details of the job-setting confirmation processing will be described hereinbelow. The job-setting confirmation processing at S1310 is processing to be executed after the job-setting confirmation button 902 is selected on the screen 900. The job-setting confirmation processing is implemented by the web browser 455 executing JavaScript provided by the web server 355. FIG. 16 is a detailed flowchart illustrating the job-setting confirmation processing.

If the job-setting confirmation button 902 is selected on the screen 900, the web browser 455 transmits request information for requesting information necessary to draw a setting confirmation screen to the web server 355 (S1601). Specifically, this request is made by transmitting an html-data reception request by executing a GET method according to http.

At S1602, the web browser 455 receives the html data and executes screen drawing processing based on the html data. As a result, the web browser 455 displays a job-setting confirmation screen (for example, FIG. 9B). In this state, the web browser 455 waits for a user operation (S1603).

In response to that the operation received from the user is selection of a close button 951 (S1604: YES), the web browser 455 advances the process to S1605 to close the print setting screen and return to the previous screen.

At S1605, the web browser 455 creates an html header (S1605) and transmits request information necessary to draw the previous screen to the web server 355 (S1606). The web browser 455 waits until receiving a response to the transmission from the printer 101 (S1607). Upon receiving html data as a response from the printer 101, the web browser 455 performs screen drawing processing based on the html data. As a result, the web browser 455 displays a hot folder screen (for example, FIG. 9A), which is the previous screen.

Folder Operation Processing (Client)

Figure 17:
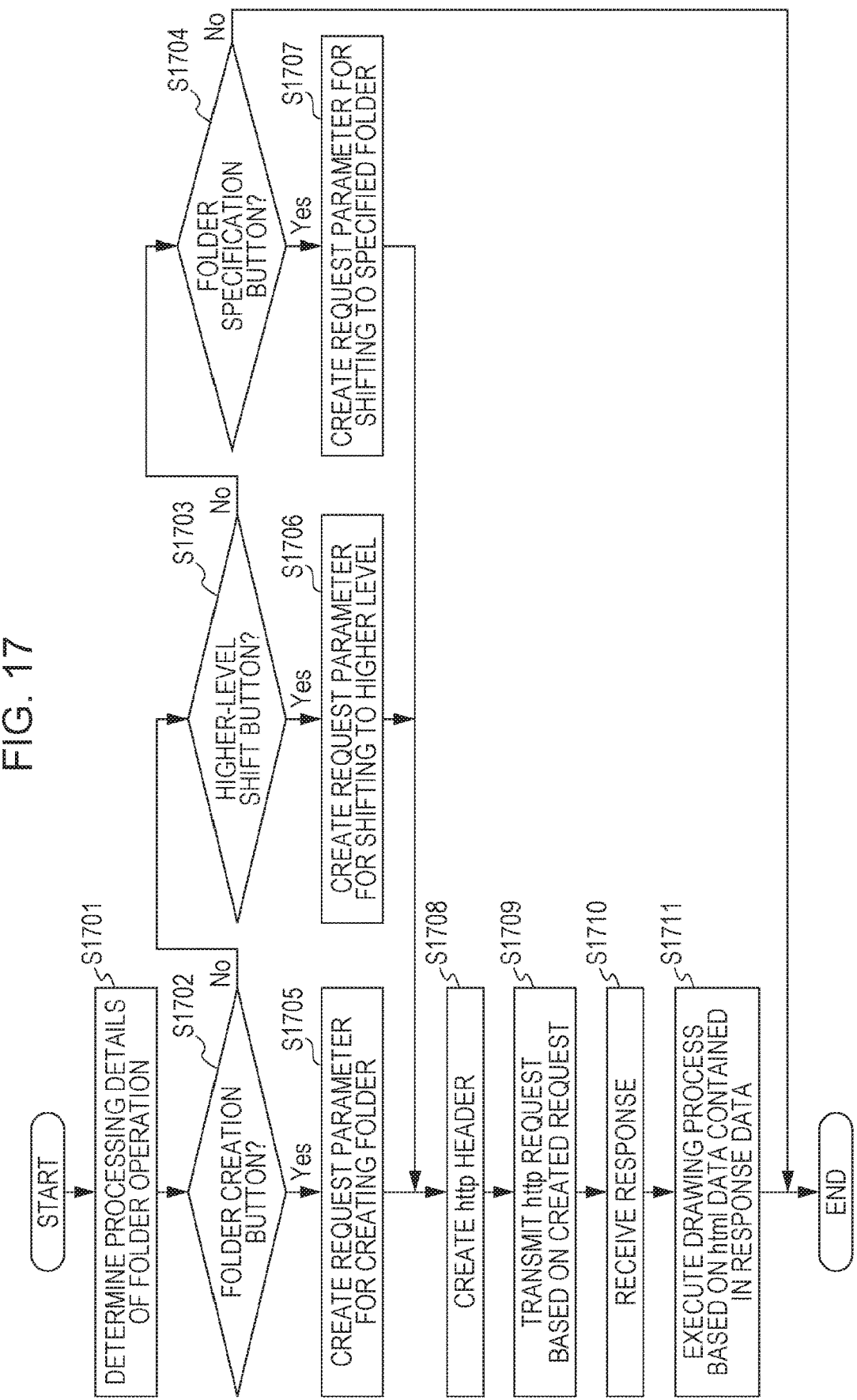
FIG. 17 is a detailed flowchart illustrating folder operation processing.

The details of the folder operation processing will be described hereinbelow. The folder operation processing at S1311 is processing to be executed when a button in the folder operating area 651 is selected, for example, on the screen 650. The folder operation processing is implemented by the web browser 455 executing JavaScript provided by the web server 355. FIG. 17 is a detailed flowchart illustrating the folder operation processing.

When an operation is performed in the folder operating area 651 of, for example, the screen 650, the web browser 455 determines what operation is performed in the folder operating area (S1701).

If the determination result shows that the operation is selection of the folder creation button 705 (S1702: YES), the web browser 455 advances the process to S1705. At S1705, the web browser 455 creates request data for the folder creation processing. This request data is transmitted from the web browser 455 to the hot folder function program 356 via the web server 355.

If the determination result shows that the operation is selection of the higher-level shift button 706 (S1702: NO, S1703: YES), the web browser 455 advances the process to S1706. At S1706, the web browser 455 creates request data for higher-level shift processing. This request data is transmitted from the web browser 455 to the hot folder function program 356 via the web server 355.

If the determination result shows that the operation is selection of the folder specification button 659 (S1702: NO, S1703: NO, S1704: YES), the web browser 455 advances the process to S1707. In other words, the selection of the folder specification button 659 is processing for selecting a button for shift to a specified lower-level folder. At S1707, the web browser 455 creates request data for lower-level shift processing. This request data is transmitted from the web browser 455 to the hot folder function program 356 via the web server 355.

If the determination result shows that the operation is not selection of any button (S1702: NO, S1703: NO, S1704: NO), the operation is irrelevant to the features of the present embodiment, and a description thereof will be omitted.

After any of the processes at S1705, S1706, and 1707 is performed, the web browser 455 advances the process to S1708. At S1708, the web browser 455 generates an http header necessary for communication with the web server 355 using http. The web browser 455 transmits the request data generated at S1705, S1706, or S1707 to the printer 101 (S1709). Specifically, the request data is transmitted from the web browser 455 to the hot folder function program 356 via the web server 355.

After transmitting the request data, the web browser 455 waits for a response from the web server 355 (S1710). Upon receiving html data as a response from the web server 355, the web browser 455 performs screen drawing processing based on the obtained html data (S1711). For example, if the folder creation button 705 is selected in a state in which the current path is "/share/folder", the web browser 455 displays the folder creation screen 700. If the higher-level shift button 706 is selected in a state in which the current path is "/share/folder", the basic screen 650 is displayed. The web browser displays the folder creation screen 700. If the higher-level shift button 706 is selected in a state in which the current path is "/share/folder", the basic screen 650 is displayed. If a folder01 button (not illustrated) is selected in a state in which the current path is "/share/folder", the web browser displays the screen 750.

Printer Control

Figure 18:
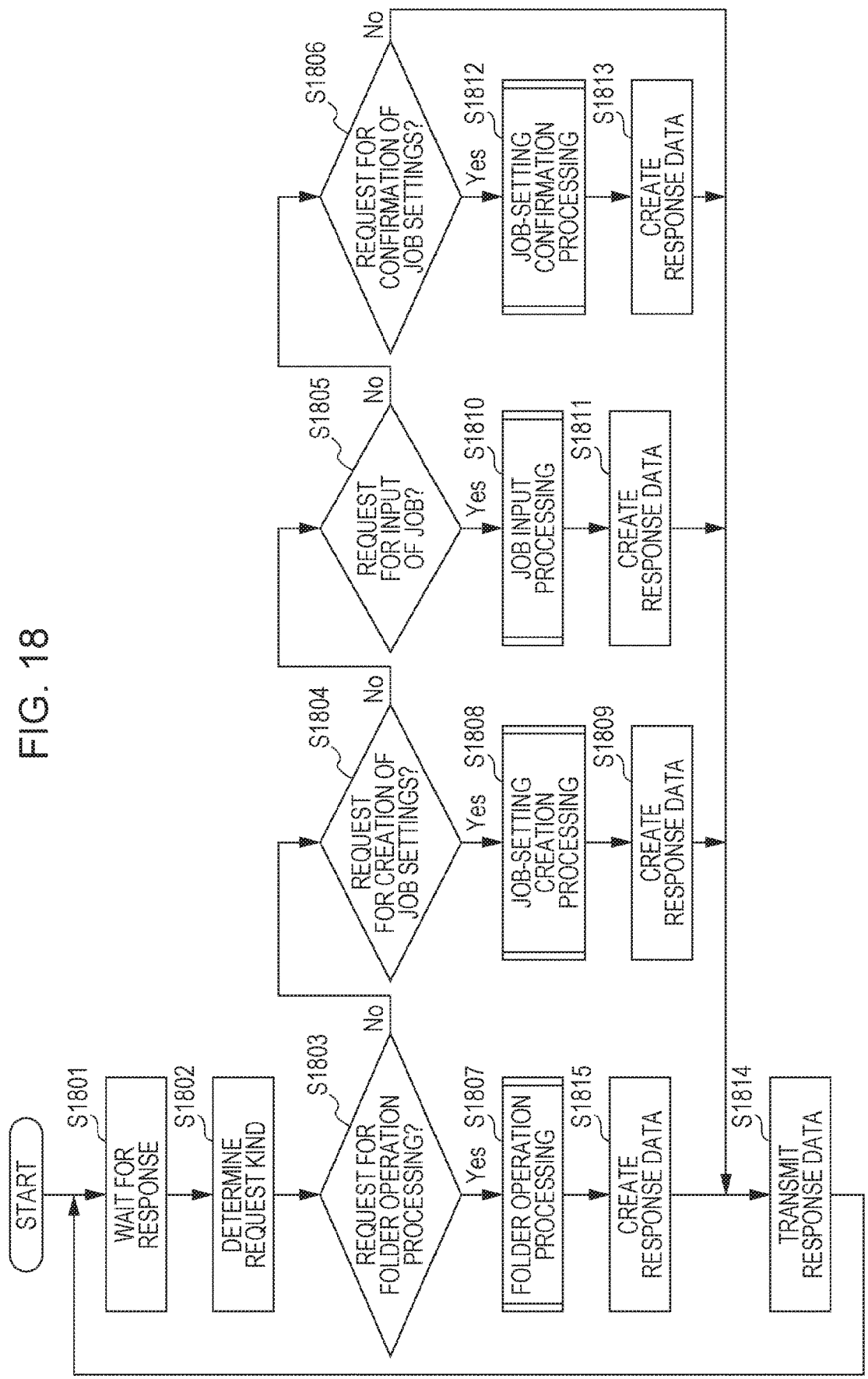
FIG. 18 is a flowchart illustrating the operation of the printer.

A processing procedure performed by the printer 101 in using the internal hot folder function will be described. FIG. 18 is a flowchart illustrating the operation of the printer 101. The procedure in FIG. 18 is implemented by the CPU 305 executing the web server 355 and the hot folder function program 356 read into the RAM 308. Although, in the present embodiment, the web server 355 and the hot folder function program 356 are different programs, the individual functions may be implemented by a single software module.

The processing of the printer is executed when a request from the web browser 455 executed by the client device (102, 103, or 104) is given. The web server 355 waits until receiving a processing request from the client device (102, 103, or 104) (S1801).

Upon receiving a request from the client device (102, 103, or 104), the web server 355 transmits the received request data to the hot folder function program 356. The hot folder function program 356 determines the kind of the request based on the obtained request data (S1802).

If the determination result shows that the request asks for folder operation processing (S1803: YES), the hot folder function program 356 advances the process to S1807. At S1807, the hot folder function program 356 executes the folder operation processing and notifies the web server 355 of the processing result. The web server 355 creates response data based on the notification content from the hot folder function program 356.

If the determination result shows that the request asks for job-setting creation processing (S1803: NO, S1804: YES), the hot folder function program 356 advances the process to S1808.

At S1807, the hot folder function program 356 executes the folder operation processing and notifies the web server 355 of the processing result. The web server 355 creates response data based on the notification content from the hot folder function program 356.

If the determination result shows that the request asks for job input processing (S1803: NO, S1804: NC), S1805: YES), the hot folder function program 356 advances the process to S1810. At S1810, the hot folder function program 356 executes the folder operation processing and notifies the web server 355 of the processing result. The web server 355 creates response data based on the notification content from the hot folder function program 356.

If the determination result shows that the request asks for job-setting confirmation processing (S1803: NO, S1804: NO, S1805: NO, S1806: YES), the hot folder function program 356 advances the process to S1812. At S1812, the hot folder function program 356 executes the folder operation processing and reports the processing result to the web server 355. The web server 355 creates response data based on the notification content from the hot folder function program 356.

After creating response data at S1815, S1809, S1811, or S1813, the web server 355 transmits the response data to the client device (102, 103, or 104) (S1814).

The web server 355 returns the process to S1801 so as to receive the next request.

Print-Job Input Processing (Server)

Figure 19:
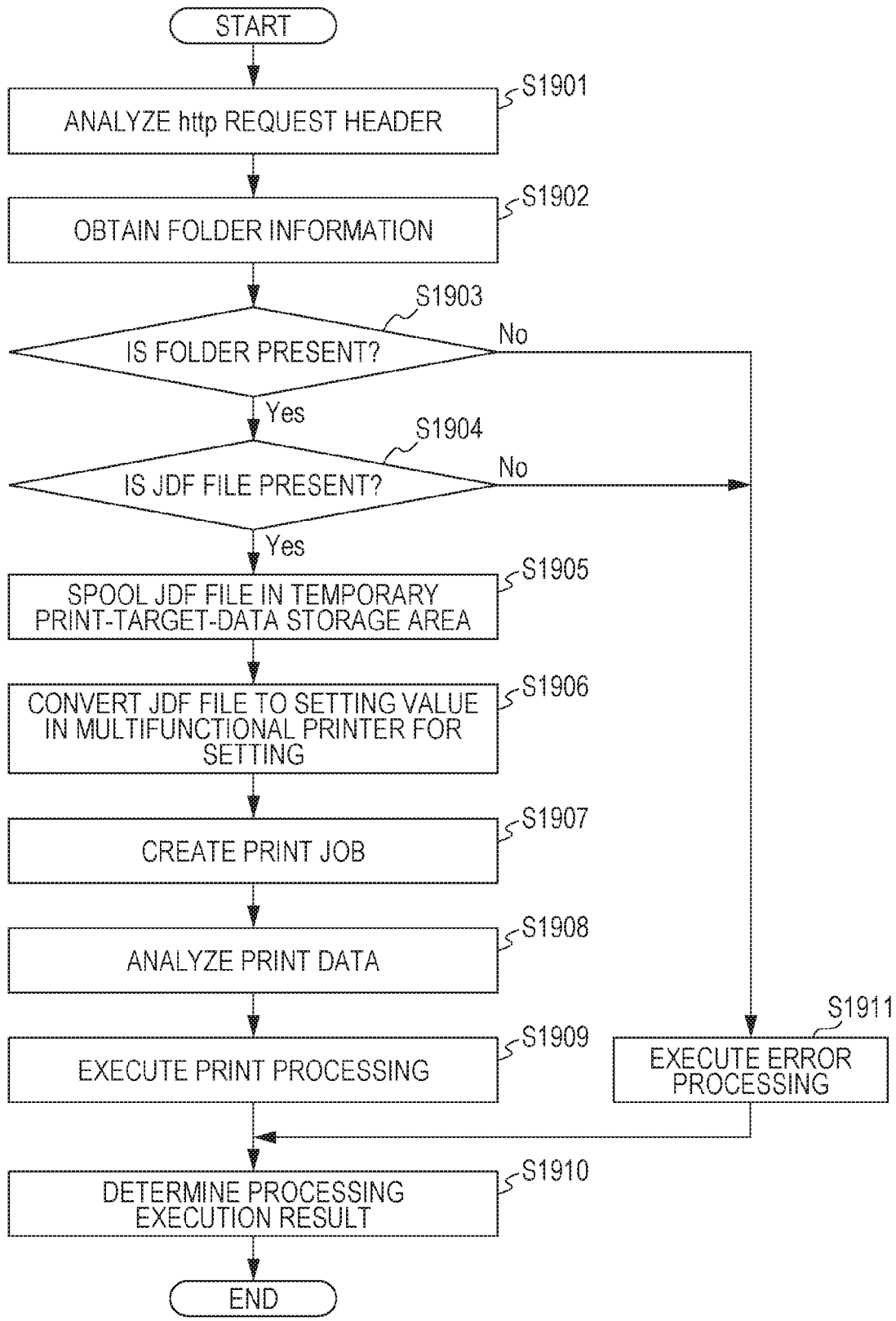
FIG. 19 is a detailed flowchart illustrating print-job generation processing.

The details of the job input processing will be described hereinbelow. The job input processing at S1810 is processing to be executed in response to acquisition of the request transmitted at S1404 via the web server 355. The job input processing is implemented by the CPU 305 executing the hot folder function program 356, the JDF function program 357, the print-job-queue management program 361, the file system (server) 354, or the like read into the RAM 308. FIG. 19 is a detailed flowchart illustrating the print-job generation processing.

Upon obtaining the request transmitted at S1404, the program 356 analyzes the request data (S1901). The request data includes data on the header and the print target file. The program 356 analyzes the html-format header of the request data. As a result of the analysis, the program 356 obtains folder path information contained in the request data. This folder path information is information for specifying a destination hot folder.

After obtaining the folder path information, the program 356 checks whether a folder specified by the path information is present (S1903). The check whether the folder is present is implemented by querying the file system (server) 354.

If the folder is present (S1903: YES), the program 356 advances the process to S1904.

If the folder is not present (S1903: NO), the program 356 determines that the request is incorrect and advances the process to S1911 so as to cope with the request as an error. At S1911, the program 356 stores the error information. Then at S1910, the program 356 notifies the web server 355 that the processing result is an error. The web server 355 which has obtained the processing result indicating the error creates response data indicating the error at S1811 and transmits the response data at S1814. As a result, the web browser 455 displays the error screen 1100.

At S1904, the program 356 determines whether the folder specified by the path information contains a JDF file. If the folder contains a JDF file (S1904: YES), the program 356 advances the process to S1905. If the folder contains no JDF file (S1904: NO), the program 356 advances the process to S1911 to cope with the request as an error. As a result, the web browser 455 displays the error screen 1100.

At S1905, the program 356 stores the received print target file in the storage device 309 via the file system (server) 354.

Next, the program 356 executes processing for analyzing the JDF file stored in the folder specified by the path information to obtain settings (S1906). The print settings obtained at S1906 are stored in the storage device 309.

As illustrated in FIG. 12B, the JDF file describes the print settings according to a syntax defined by the JDF in the text data expressed in the XML format. In the JDF analyzing processing, the program 356 performs XML analysis and syntax analysis. Descriptions of the detailed algorithms of the XML analyzing processing and the syntax analyzing processing will be omitted.

The program 356 sets the print target file and the print settings in the JDF function program 357 and starts the JDF function program 357. Thus, the print job to be executed by the JDF function program 357 is registered (S1907).

The JDF function program 357 analyzes the format of the print target file at S1908 so as to execute the print job. The JDF function program 357 executes processing for converting the print target file to image information that can be printed by the printing device 303 of the printer 101. At that time, the print setting information set at S1907 is reflected. The program 356 gives a control instruction to the printing device 303 and the sheet processing device 310 based on the print settings. As a result, print processing based on the converted image information is executed by the printing device 303 (S1909). In other words, the product is provided to the user.

After it is determined that the print-target-data printing processing is successfully completed (S1910), the program 356 notifies the web server 355 of the successful completion. The web server 355 creates response data indicating the successful completion at S1811 based on the notification and transmits the response data at S1814. As a result, the web browser 455 displays a message about the successful completion and print history information.

Job-Setting Creation Processing (Server)

Figure 20:
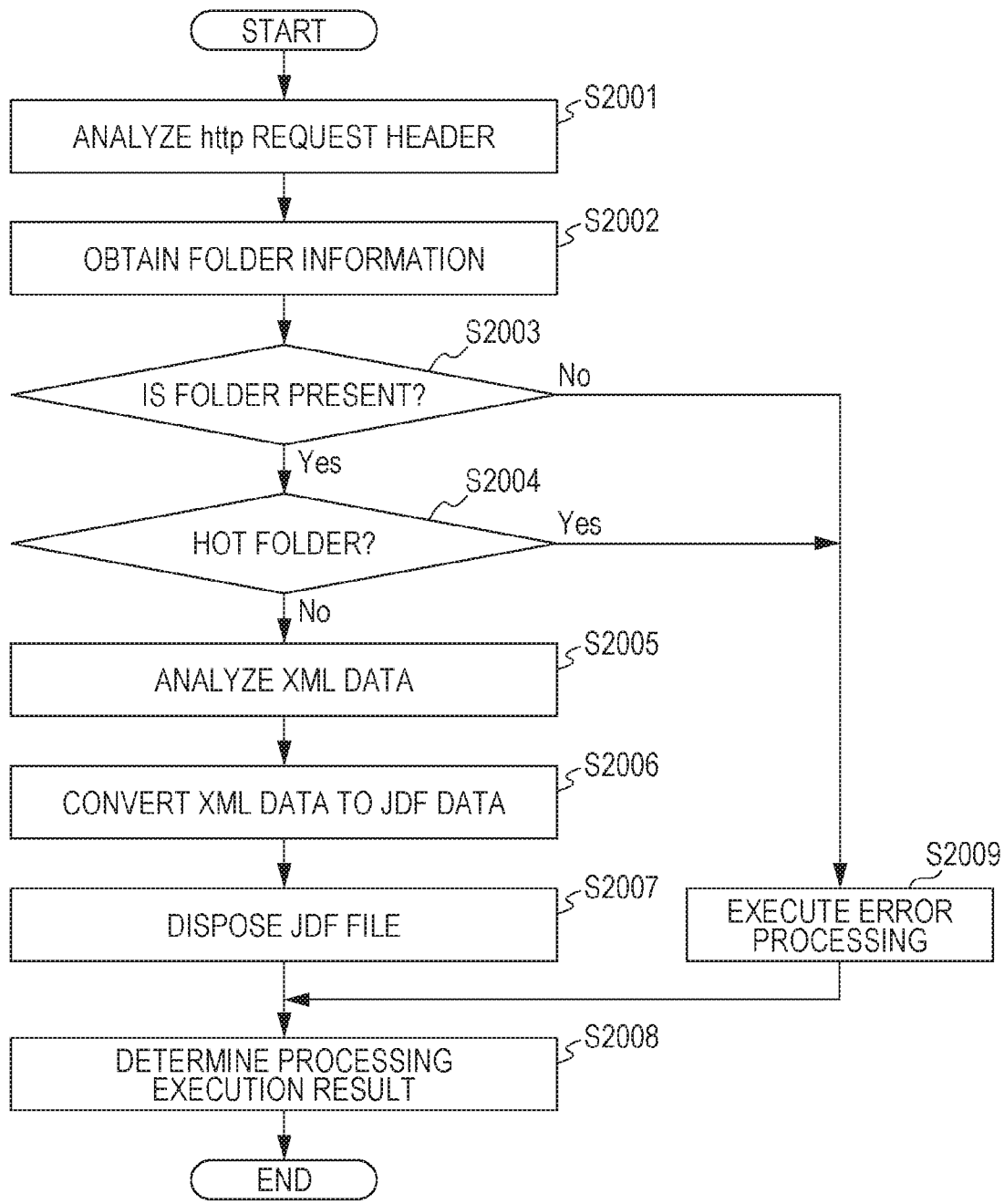
FIG. 20 is a detailed flowchart illustrating job-setting creation processing.

The details of the job-setting creation processing will be described hereinbelow. The job-setting creation processing at S1808 is processing to be executed in response to acquisition of the request transmitted at S1501 via the web server 355. The job-setting creation processing is implemented by the CPU 305 executing the hot folder function program 356 read into the RAM 308. FIG. 20 is a detailed flowchart illustrating the job-setting creation processing.

The hot folder function program 356 obtains and analyzes the request transmitted at S1501. The request data contains an html-format header and an XML-format data. The hot folder function program 356 analyzes information contained in the html-format header of the request data (S2001).

The program 356 obtains folder path information contained in the request data (S2002). The path information is information necessary to specify a folder to be functioned as a hot folder, that is, information necessary to determine the folder in which the JDF file is to be disposed.

At S2003, the program 356 determines whether a folder corresponding to the path information is present. This processing is implemented by querying the file system (server) 354.

If the folder is present (S2003: YES), the program 356 advances the process to S2004.

If the folder is not present (S2003: NO), the program 356 determines that the request is incorrect and advances the process to S2009 to cope with the request as an error. At S2009, the program 356 stores the error information. Then at S2008, the program 356 notifies the web server 355 that the processing execution result is an error. The web server 355 which has obtained the processing result indicating the error creates response data indicating the error at S1809 and transmits the response data at S1814. As a result, the web browser 455 displays the error screen 1100.

At S2004, the program 356 determines whether the folder for which path information is specified contains a JDF file. In other words, the program 356 determines whether the folder for which path information is specified is a hot folder.

If the folder contains no JDF file (S2004: NO), the program 356 advances the process to S2005 so as to continue the hot-folder creation processing. If the folder contains a JDF file (S2004: YES), the program 356 advances the process to S2009 to copes with the request as an error. This is because the request for converting the folder that is a hot folder to a hot folder is regarded as incorrect processing. As a result, the web browser 455 displays the error screen 1100.

At S2005, the program 356 analyzes the received XML data. The program 356 creates a JDF-format file based on the setting information obtained by analyzing the XML data (S2006). The program 356 disposes the created JDF file to a specified folder (S2007).

After completion of disposition of the JDF file, the program 356 sends a completion notification to the web server 355 at S2008. The web server 355 creates response data at the time of successful completion in response to the notification (S1811). The web server 355 transmits the response data to the client device (102, 103, or 104) (S1814). As a result, at S1509, the web browser 455 displays a hot folder screen (for example, FIG. 9A).

Job-Setting Confirmation Processing (Server)

Figure 21:
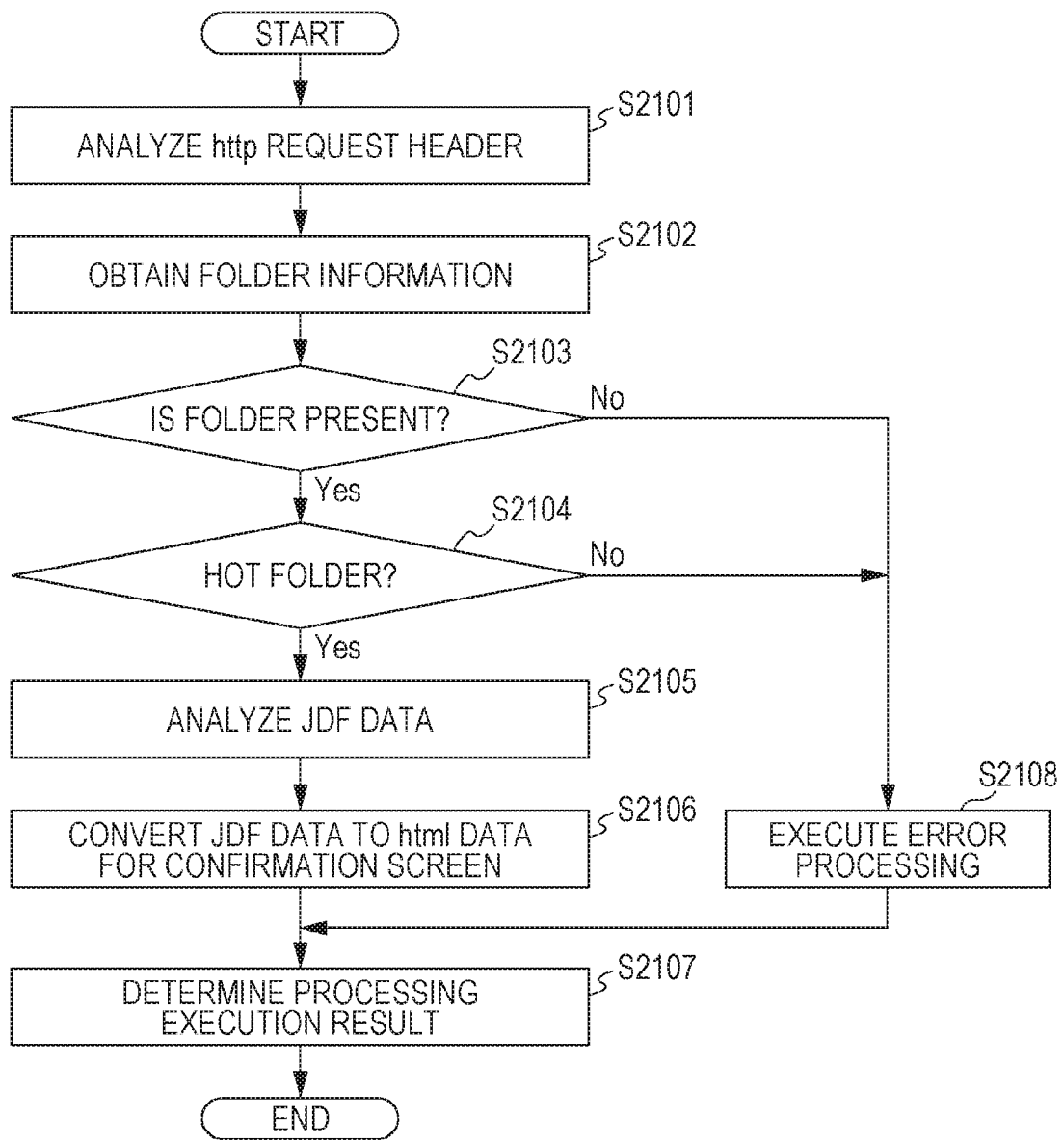
FIG. 21 is a detailed flowchart illustrating job-setting confirmation processing.

The details of the job-setting confirmation processing will be described hereinbelow. The job-setting confirmation processing at S1812 is processing to be executed in response to acquisition of the request transmitted at S1601 via the web server 355. The job-setting confirmation processing is implemented by the CPU 305 executing the hot folder function program 356 read into the RAM 308. FIG. 21 is a detailed flowchart illustrating the job-setting confirmation processing.

Upon receiving the request transmitted at S1601, the program 356 analyzes information contained in the html header of the request data (S2101).

The program 356 obtains the folder path information contained in the request data (S2102). This path information is information necessary to specify a hot folder for which setting is to be determined, that is, necessary to specify the folder in which the JDF file is disposed.

At S2103, the program 356 determines whether a folder corresponding to the path information is present. The processing is implemented by querying the file system (server) 354.

If the folder is present (S2103: YES), the program 356 advances the process to S2104.

If the folder is not present (S2103: NO), the program 356 determines that the request is incorrect and advances the process to S2108 to cope with the request as an error. At S2108, the program 356 stores the error information. Thereafter, at S2108, the program 356 notifies the web server 355 that the processing execution result is an error. At S1806, the web server 355 which obtains the error processing result creates response data indicating the error and transmits the response data at S1814. As a result, the web browser 455 displays the error screen 1100.

At S2104, the program 356 determines whether the folder for which path information is specified contains a JDF file. In other words, the program 356 determines whether the folder for which path information is specified is a hot folder.

If the JDF file is present (S2104: YES), the program 356 advances the process to S2105. If no JDF file is present (S2104: NO), the program 356 advances the process to S2108 to cope with the request as an error. This is because a request for checking settings for a folder that is not a hot folder is regarded as an incorrect process. As a result, the web browser 455 displays the error screen 1100.

At S2105, the program 356 analyzes the JDF file stored in the folder for which path information is specified to extract print settings. The program 356 performs conversion processing for describing the extracted print settings in the html format (S2106).

Upon completion of the conversion processing, the program 356 notifies the web server 355 of the completion of the processing and the html-format print settings at S2107. The web server 355 creates response data at the time of the successful completion based on the notification (S1811). The web server 355 transmits the response data to the client device (102, 103, or 104) (S1814). As a result, at S1602, the web browser 455 displays a setting confirmation screen (for example, FIG. 9B).

Folder Operation Processing (Server)

The details of the job operation processing will be described hereinbelow. The folder operation processing at S1807 is executed in response to acquisition of the request transmitted at S1709 via the web server 355. The folder operation processing is implemented by the CPU 305 executing the hot folder function program 356 read into the RAM 308. FIG. 22 is a detailed flowchart illustrating the folder operation processing.

Upon receiving the request transmitted at S1709, the program 356 performs request-data analyzing processing. The program 356 analyzes information contained in the html-format header of the information in the request data.

As a result of the analysis, the program 356 obtains the folder path information and information on the folder operation instruction. The program 356 determines the details of the operation instruction based on the information (S2202).

If the determination result at S2202 shows that the request asks for folder creation processing (S2203: YES), the program 356 advances the process to S2204. Specifically, if the request data contains operation information indicating that the folder creation button 705 is selected, that folder name is input to the name entry field, and that the OK button 704 is selected, the program 356 determines that the requested processing is folder creation processing. The program 356 creates a folder with the specified name on the specified path based on the request data. For example the "folder01" folder is created under the path of "/share/folder/". The creation of the folder is implemented by transmitting a folder creation request to the file system (server) 354. After creating the folder, the program 356 notifies the web server of information indicating completion of folder creation. Thus, response data containing information on the screen after the folder is created is transmitted from the web server to the client device (102, 103, or 104). As a result, at S1711, a screen showing the path of the storage destination of the new folder is displayed on the web browser (S2209).

If the determination result at S2202 shows that the request asks for folder shifting processing (S2203: NO, S2205: YES), the program 356 advances the process to S2206. At S2206, the program 356 determines the requested hierarchical shifting direction. If the request asks for shifting from the current path to a higher level, the program 356 advances the process to S2207. If the request asks for shifting from the current path to a lower level, the program 356 advances the process to S2208. The request to shift from the current path to a higher level is contained in the request data when the higher-level shift button 706 is selected. The request to shift from current path to a lower level is contained in the request data when a folder specification button (for example, the button 659) is selected.

At S2207, the program 356 determines whether the hierarchy destination is an accessible highest-level folder (S2207). If the hierarchy destination is not a highest-level folder (S2207: NO), the program 356 advances the process to S2211 to obtain information on the destination folder.

If the hierarchy destination is a highest-level folder (S2207: YES), the program 356 notifies the web server 355 of information for displaying a screen for the highest-level folder. Thus, response data containing highest-level screen information is transmitted from the web server 355 to the client device (102, 103, or 104). As a result, at S1711, the web browser 355 displays a highest-level screen (for example, FIG. 6B). The highest-level screen does not display a higher-level shift button.

At S2208, the program 356 determines whether a specified lower-level folder is present. If the specified folder is present (S2208: YES), the program 356 advances the process to S2212 to obtain information on the destination folder. If the specified folder is not present, the request is an incorrect request, and the program 356 advances the process to S2213 to cope with the request as an error. At S2213, the program 356 notifies the web server 355 that the processing execution result is an error. The web server 355 after obtaining the error processing result creates response data indicating the error at S1815 and transmits the response data at S1814. As a result, the web browser 455 displays the error screen 1100.

After obtaining folder information at S2211 or S2212, the program 356 determines whether the specified folder contains a JDF file (S2214). In other words, the program 356 determines whether the destination folder is a hot folder.

If the destination stores a JDF file (S2214: YES), the program 356 notifies the web server 355 of information for displaying a screen for a hot folder. Thus, response data containing the screen information for the hot folder is transmitted from the web server 355 to the client device (102, 103, or 104). As a result, at S1711, the web browser 455 displays a screen for a hot folder (for example, FIG. 9A).

If the destination does not store a JDF file (S2214: NO), the program 356 notifies the web server 355 of information for displaying a screen for a normal folder. Thus, response data containing screen information for the normal folder is transmitted from the web server 355 to the client device (102, 103, or 104). As a result, at S1711, the web browser 455 displays a screen for a normal folder (for example, FIG. 7B).

If the determination result of S2202 shows that the requested processing is neither folder creating processing nor folder shifting processing (S2203: NO, S2205: NO), the program 356 determines that the request is incorrect and advances the process to S2213 to cope with the request as an error. At S2213, the program 356 notifies the web server 355 that the processing execution result is an error. The web server 355 which has obtained the error processing result creates response data indicating the error at S1815 and transmits the response data at S1814. As a result, the web browser 455 displays the error screen 1100.

Remarks

As described above, the printing system 1 can input a print file by dragging and dropping the file by using JavaScript on the web browser. This allows using the folder in the same way as the known hot folder, providing excellent operability.

The printing system 1 detects an input of a print target file on a web browser and notifies the client device (102, 103, or 104) of the input. This allows the input print target file to be quickly processed for printing. In other words, the method of regular monitoring as in the related art causes a delay from the time a file is input until the file is detected, in contrast, the present embodiment resolves the problem. Accordingly, the present embodiment provides a printer having an internal hot folder function capable of reducing print waiting time.

Furthermore, the present embodiment eliminates the need for regular folder monitoring in using the hot folder function. This therefore reduces the number of accesses to a storage (for example, HDD or SSD) that provides the hot folder. This suppresses a decrease in the life of the storage. Furthermore, reducing or turning off the power to the storage when the storage is not accessed saves the power.

The embodiments of the present disclosure provide a print-file specification environment for various devices in an image forming system for printing a print file using print settings linked to folders. In particular, the embodiments provide an intuitive operation environment using a drag-and-drop operation.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions front the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-108110, filed Jun. 5, 2018, which is hereby incorporated by reference herein in its entirety.

What is claimed is:

1. An image forming system in which an information processing apparatus utilizing a web browser and an image forming apparatus that provides a folder accessible from the information processing apparatus are communicably connected the information processing apparatus comprising:
a memory device that stores a set of instructions; and
at least one processor that executes the set of instructions to:
display a screen that shows folder information provided by the image forming apparatus on a web browser based on screen information received from the image forming apparatus, wherein, in a case where a print setting is not associated with a folder of the folder information displayed on the screen, information indicating that a print setting is not associated is displayed, and
accept, in a case where a print setting is associated with a folder of the folder information displayed on the screen, specifying of print target data by a predetermined operation on the screen displayed on the web browser, and
transmit the print target data the specifying of which has been accepted and the folder information to the image forming apparatus,
the image forming apparatus comprising:
a memory device that stores a set of instructions; and
at least one processor that executes the set of instructions to:
receive the print target data and the folder information from the information processing apparatus,
store the print target data received from the information processing apparatus into a folder which is linked to the received folder information and with which a print setting is associated, and
start printing out the stored print target data by using the print setting associated with the folder.

2. The image forming system according to claim 1, wherein the print setting associated with the folder is a print setting described in a print setting file stored in the folder.

3. The image forming system according to claim 2, further configured to create the print setting file based on print setting information described in a markup language.

4. The image forming system according to claim 3, wherein the print setting file comprises a job definition format (JDF) file.

5. The image forming system according to claim 2, wherein the print target data comprises a portable document format (PDF) file.

6. The image forming system according to claim 1, wherein the folder information is described in a markup language.

7. The image forming system according to claim 1, wherein the image forming apparatus is further configured to output screen information to the web browser of the information processing apparatus for specifying a share folder linked to print settings so as to cause the information processing apparatus to display a screen based on the screen information.

8. The image forming system according to claim 1, wherein items specified by the print setting include at least one of color or monochrome, number of copies, sheet size, sheet type, one-sided or two-sided, bookbinding, opening direction, saddle stitch, sort mode, sorting-out during ejection of multiple copies, multi-copy at shift discharge, punching, stapling, and folding.

9. The image forming system according to claim 1,
wherein, in a case where a print setting is not associated with a folder of the folder information displayed on the screen, specifying of a JDF file by a predetermined operation on the screen displayed on the web browser is accepted.

10. The image forming system according to claim 1,
wherein, when the screen that shows the folder information provided by the image forming apparatus is displayed on the web browser, in a case where a print setting is not associated with the folder of the folder information displayed on the screen, a screen that includes a button for accepting setting of a print setting is displayed.

11. The image forming system according to claim 1,
wherein, when the screen that shows the folder information provided by the image forming apparatus is displayed on the web browser, in a case where a print setting is associated with the folder of the folder information displayed on the screen, information that indicates that the folder is a hot folder is displayed.

12. The image forming system according to claim 1,
wherein, when the screen that shows the folder information provided by the image forming apparatus is displayed on the web browser, in a case where a print setting is associated with the folder of the folder information displayed on the screen, a screen that includes a button for print setting confirmation is displayed.

* * * * *